US012583444B2

(12) United States Patent
Okabe et al.

(10) Patent No.: US 12,583,444 B2
(45) Date of Patent: Mar. 24, 2026

(54) PARKING SUPPORT METHOD, PARKING SUPPORT APPARATUS, AND COMPUTER-READABLE RECORDING MEDIUM

(71) Applicant: Panasonic Automotive Systems Co., Ltd., Kanagawa (JP)

(72) Inventors: Yoshimasa Okabe, Kanagawa (JP); Hirofumi Nishimura, Kanagawa (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 82 days.

(21) Appl. No.: 18/825,142

(22) Filed: Sep. 5, 2024

(65) Prior Publication Data

US 2025/0083664 A1 Mar. 13, 2025

(30) Foreign Application Priority Data

Sep. 13, 2023 (JP) ................................. 2023-148443

(51) Int. Cl.
*B60W 30/06* (2006.01)
*B60W 50/08* (2020.01)
*G01C 21/34* (2006.01)

(52) U.S. Cl.
CPC ............ *B60W 30/06* (2013.01); *B60W 50/08* (2013.01); *G01C 21/3415* (2013.01)

(58) Field of Classification Search
CPC ... B60W 30/06; B60W 50/08; G01C 21/3415; B62D 15/0285
See application file for complete search history.

(56) References Cited

U.S. PATENT DOCUMENTS

| | | | | |
|---|---|---|---|---|
| 4,931,930 A | * | 6/1990 | Shyu | B62D 15/028 |
| | | | | 180/199 |
| 5,530,771 A | * | 6/1996 | Maekawa | G01S 5/16 |
| | | | | 382/104 |
| 5,646,614 A | * | 7/1997 | Abersfelder | B60Q 9/005 |
| | | | | 348/E7.087 |

(Continued)

FOREIGN PATENT DOCUMENTS

| | | | | |
|---|---|---|---|---|
| BR | 112019027612 B1 | * | 7/2023 | |
| CN | 105377635 A | * | 3/2016 | B62D 15/0285 |

(Continued)

OTHER PUBLICATIONS

"IPLMS: An intelligent parking lot management system;" Wang et al., 2015 Long Island Systems, Applications and Technology (2015, pp. 1-6); May 1, 2015. (Year: 2015).*

(Continued)

*Primary Examiner* — Khoi H Tran
*Assistant Examiner* — Jorge O Peche
(74) *Attorney, Agent, or Firm* — Greenblum & Bernstein, P.L.C.

(57) ABSTRACT

A parking support method sets a parking route for parking a vehicle in a first parking slot, sets a branching point on the parking route, and sets a branching route for parking the vehicle in a second parking slot from the branching point. When a change instruction operation is detected while the vehicle is being automatically parked along the first parking route, the vehicle is automatically parked along the branching route.

19 Claims, 8 Drawing Sheets

(56) References Cited

U.S. PATENT DOCUMENTS

| | | | | | |
|---|---|---|---|---|---|
| 5,742,141 | A * | 4/1998 | Czekaj | ............... | B62D 15/0285 |
| | | | | | 180/199 |
| 5,945,799 | A * | 8/1999 | Shimizu | ............. | B62D 15/0285 |
| | | | | | 318/587 |
| 6,018,692 | A * | 1/2000 | Shimizu | ............. | B62D 15/0285 |
| | | | | | 318/587 |
| 6,061,002 | A * | 5/2000 | Weber | ................... | B60Q 9/007 |
| | | | | | 701/527 |
| 6,081,206 | A * | 6/2000 | Kielland | ............ | G06Q 30/0284 |
| | | | | | 194/902 |
| 6,411,867 | B1 * | 6/2002 | Sakiyama | ................ | B60R 1/26 |
| | | | | | 701/72 |
| 7,366,595 | B1 * | 4/2008 | Shimizu | ................ | B60K 35/10 |
| | | | | | 701/472 |
| 9,557,741 | B1 * | 1/2017 | Elie | ........................ | G08G 1/147 |
| 9,630,617 | B2 * | 4/2017 | Burtsche | ............ | B62D 15/0285 |
| 9,969,386 | B1 * | 5/2018 | Wang | ................... | B62D 15/027 |
| 11,312,388 | B2 * | 4/2022 | Sannodo | .............. | B60W 30/06 |
| 12,260,764 | B2 * | 3/2025 | Okabe | ................... | G08G 1/168 |
| 12,269,508 | B1 * | 4/2025 | Funke | ................ | B60W 40/02 |
| 12,291,191 | B1 * | 5/2025 | Funke | ................ | B60W 30/06 |
| 12,291,193 | B1 * | 5/2025 | Qian | .................. | G01C 21/3453 |
| 2008/0033640 | A1 * | 2/2008 | Amano | ............. | G01C 21/3476 |
| | | | | | 701/414 |
| 2009/0128364 | A1 * | 5/2009 | Lee | ...................... | G06V 20/586 |
| | | | | | 340/932.2 |
| 2009/0164066 | A1 * | 6/2009 | Oezaslan | ........... | B62D 15/0285 |
| | | | | | 701/41 |
| 2011/0054739 | A1 * | 3/2011 | Bammert | ............. | B62D 15/028 |
| | | | | | 701/41 |
| 2011/0080304 | A1 * | 4/2011 | Toledo | ................... | G08G 1/165 |
| | | | | | 701/41 |
| 2013/0124041 | A1 * | 5/2013 | Belser | .................... | G08G 1/168 |
| | | | | | 701/41 |
| 2015/0032319 | A1 * | 1/2015 | Kim | ..................... | B62D 15/027 |
| | | | | | 701/23 |
| 2015/0073661 | A1 * | 3/2015 | Raisch | ................. | B62D 15/027 |
| | | | | | 701/41 |
| 2015/0307090 | A1 * | 10/2015 | Satonaka | ........... | B62D 15/0285 |
| | | | | | 701/23 |
| 2016/0280263 | A1 * | 9/2016 | Mori | .................... | B62D 15/027 |
| 2016/0371978 | A1 * | 12/2016 | Nordbruch | .......... | G08G 1/0116 |
| 2017/0008515 | A1 * | 1/2017 | Seo | ....................... | B60W 10/04 |
| 2017/0129485 | A1 * | 5/2017 | Seo | ..................... | B62D 15/027 |
| 2018/0273028 | A1 * | 9/2018 | Kato | ..................... | B60W 30/06 |
| 2018/0328750 | A1 * | 11/2018 | Yun | ...................... | G06V 20/586 |
| 2018/0339701 | A1 * | 11/2018 | Kwon | ................. | G05D 1/0257 |
| 2018/0345955 | A1 * | 12/2018 | Kim | ................... | B62D 15/0285 |
| 2018/0354503 | A1 * | 12/2018 | Sassa | ................. | B62D 15/0285 |
| 2018/0357906 | A1 * | 12/2018 | Yaldo | .................... | G08G 1/202 |
| 2019/0118801 | A1 * | 4/2019 | Noh | ..................... | B60W 30/095 |
| 2019/0193724 | A1 * | 6/2019 | Kim | ....................... | G06V 20/54 |
| 2020/0001862 | A1 * | 1/2020 | Luo | ..................... | B60W 60/001 |
| 2020/0148199 | A1 * | 5/2020 | Hasejima | ........... | B62D 15/0285 |
| 2020/0398825 | A1 * | 12/2020 | Tsujino | ................ | B60W 30/06 |
| 2020/0398829 | A1 * | 12/2020 | Kasai | .................... | B60K 35/29 |
| 2020/0398867 | A1 * | 12/2020 | Hara | ..................... | B60W 30/09 |
| 2021/0080283 | A1 * | 3/2021 | Belzner | .................. | G08G 1/148 |
| 2021/0327272 | A1 * | 10/2021 | Lee | ................... | G01C 21/3453 |
| 2021/0354688 | A1 * | 11/2021 | Tashiro | ................. | B60W 30/06 |

| | | | | | |
|---|---|---|---|---|---|
| 2022/0196424 | A1 * | 6/2022 | Takeuchi | ........... | G01C 21/3617 |
| 2022/0297676 | A1 * | 9/2022 | Suzuki | ................ | B60W 60/005 |
| 2022/0414553 | A1 * | 12/2022 | Yamada | ................. | G06Q 10/02 |
| 2023/0074587 | A1 * | 3/2023 | Hidaka | .................. | G08G 1/143 |
| 2023/0107149 | A1 * | 4/2023 | Heise | ............... | G08G 1/096844 |
| | | | | | 340/932.2 |
| 2023/0304823 | A1 * | 9/2023 | Yuan | ...................... | G08G 1/144 |
| 2024/0208486 | A1 * | 6/2024 | Qian | .............. | B60W 60/00253 |
| 2025/0002006 | A1 * | 1/2025 | Ogawa | ................. | G08G 1/143 |
| 2025/0083664 | A1 * | 3/2025 | Okabe | ................... | B60W 30/06 |
| 2025/0100545 | A1 * | 3/2025 | Name | ................... | B60W 30/06 |

FOREIGN PATENT DOCUMENTS

| | | | | | |
|---|---|---|---|---|---|
| CN | 106536314 | A * | 3/2017 | ........ | B62D 15/0285 |
| CN | 112185107 | A * | 1/2021 | .......... | G08G 1/0137 |
| CN | 112644469 | A * | 4/2021 | ........ | B62D 15/0285 |
| CN | 112785864 | A * | 5/2021 | ....... | G08G 1/096833 |
| CN | 110494338 | B * | 8/2022 | ............ | B60W 10/20 |
| CN | 120564456 | A * | 8/2025 | .............. | G08G 1/04 |
| CN | 120663915 | A * | 9/2025 | | |
| DE | 10026237 | A1 * | 12/2000 | ........ | B62D 15/0285 |
| DE | 102005046827 | A1 * | 4/2006 | ............ | G08G 1/165 |
| DE | 102015115254 | A1 * | 3/2016 | ............ | B60W 50/14 |
| DE | 112014003229 | T5 * | 5/2016 | ............ | G05D 1/005 |
| DE | 102016122289 | A1 * | 5/2018 | ............ | G08G 1/168 |
| DE | 102017204830 | A1 * | 9/2018 | ............ | B60W 30/06 |
| DE | 112019000259 | T5 * | 10/2020 | .......... | G06V 20/588 |
| EP | 1327559 | A1 * | 7/2003 | ........ | B62D 15/0285 |
| EP | 1533181 | A2 * | 5/2005 | ............ | B60Q 9/006 |
| EP | 3378738 | A1 * | 9/2018 | .......... | G05D 1/0246 |
| EP | 3401191 | A1 * | 11/2018 | ............ | G08G 1/143 |
| EP | 3613647 | B1 * | 12/2022 | .......... | B62D 15/025 |
| JP | 4245817 | B2 * | 4/2009 | | |
| JP | 2019151183 | A * | 9/2019 | .......... | G06V 20/586 |
| JP | 2023015476 | A * | 2/2023 | | |
| JP | 7367329 | B2 * | 10/2023 | | |
| JP | 7541843 | B2 * | 8/2024 | ............ | G08G 1/143 |
| KR | 20090125075 | A * | 12/2009 | ............ | B60W 10/20 |
| KR | 20170070480 | A * | 6/2017 | ........ | G01C 21/3407 |
| KR | 20180136134 | A * | 12/2018 | ............ | B60W 30/06 |
| KR | 102052188 | B1 * | 12/2019 | ......... | B60W 30/181 |
| WO | WO-2012143033 | A1 * | 10/2012 | ........ | B62D 15/0285 |
| WO | WO-2017068694 | A1 * | 4/2017 | .......... | B60W 40/105 |
| WO | 2017/145364 | | 8/2017 | | |
| WO | WO-2018186407 | A1 * | 10/2018 | .............. | G08G 1/16 |
| WO | 2019/058781 | | 3/2019 | | |
| WO | WO-2024161520 | A1 * | 8/2024 | ........ | B62D 15/0285 |
| WO | WO-2025098442 | A1 * | 5/2025 | ........... | B60W 30/06 |

OTHER PUBLICATIONS

"Design and implementation of autonomous vehicle valet parking system;" Kyoung-Wook et al.; 16th International IEEE Conference on Intelligent Transportation Systems (ITSC 2013) (2013, pp. 2082-2087); Feb. 13, 2014. (Year: 2014).*

"A Study of Automatic Parallel Parking System—from the Viewpoints of User and Manufacturer;" Run et al.; 2011 Third Pacific-Asia Conference on Circuits, Communications and System (PACCS) (2011, pp. 1-5); Jul. 1, 2011. (Year: 2011).*

* cited by examiner

PARKING SUPPORT METHOD, PARKING SUPPORT APPARATUS, AND COMPUTER-READABLE RECORDING MEDIUM

TECHNICAL FIELD

The present disclosure relates to a parking support method, a parking support apparatus, and a computer-readable recording medium.

BACKGROUND ART

Conventionally, known is a parking support apparatus that, while a vehicle is autonomously traveling toward a target parking slot, displays a detected parking slot on an image and changes the target parking slot based on the selection of the parking slot by the driver (see, for example, Patent Literature (hereinafter, referred to as PTL) 1).

CITATION LIST

Patent Literature

PTL 1
WO2019/058781

SUMMARY OF INVENTION

Technical Problem

In a parking lot, however, pedestrians may suddenly appear from behind a vehicle, and therefore, the driver should visually check the surroundings of the vehicle to ensure safety and make efforts to prevent accidents, even during autonomous traveling. The configuration described in PTL 1 involves showing an image to the driver to prompt an operation to change the target parking slot, which may hinder the driver's ability to perform a safety check. Further, when the configuration requires to stop the vehicle for accepting the operation for changing the mode, safety is improved, but the time required for parking becomes longer and convenience is thus reduced.

An object of the present disclosure is to provide a parking support method, a parking support apparatus, and a computer-readable recording medium, which make it possible to automatically park in a changed target parking slot without requiring visual recognition of a screen for changing the target parking slot or an operation on the screen, and without any stopping during the procedure.

Solution to Problem

A parking support method of the present disclosure includes:

receiving operation from a passenger of a vehicle;
detecting a parking slot;
setting a parking route for the vehicle;
setting a branching route that branches from the parking route; and
performing automatic parking of the vehicle along the parking route,
in which,
when a plurality of the parking slots are detected in the detecting the parking slot, the setting the parking route includes setting a parking route for parking the vehicle in a first parking slot, and
the setting the branching route includes setting a branching point on the parking route and setting a branching route for parking the vehicle in a second parking slot from the branching point, and
the parking support method further includes:
in the performing the automatic parking, receiving a change instruction operation for changing a target parking slot while the automatic parking of the vehicle is performed along a first parking route, and
in the receiving the change instruction operation, performing the automatic parking of the vehicle along the branching route when the change instruction operation is detected.

A parking support apparatus of the present disclosure includes:
a processor that performs
receiving operation from a passenger of a vehicle,
detecting a parking slot,
setting a parking route for the vehicle, and
performing automatic parking of the vehicle along the parking route,
in which, the processor performs
in the setting the parking route, setting a branching route that branches from the parking route,
when a plurality of the parking slots are detected in the detecting the parking slot,
setting a parking route for parking the vehicle in a first parking slot, and
setting a branching point on the parking route and setting a branching route for parking the vehicle in a second parking slot from the branching point,
in the automatic parking, receiving a change instruction operation for changing a target parking slot while the automatic parking of the vehicle is performed along a first parking route, and
performing the automatic parking of the vehicle along the branching route when the change instruction operation is detected.

A computer-readable recording medium of the present disclosure is a computer-readable recording medium storing a parking support program, the parking support program causing a computer of a vehicle to execute:
reception processing of receiving operation from a passenger of the vehicle;
detection processing of detecting a parking slot;
route setting processing of setting a parking route for the vehicle;
branching setting processing of setting a branching route that branches from the parking route; and
automatic parking processing of performing automatic parking of the vehicle along the parking route,
in which
when a plurality of the parking slots are detected in the detection processing,
the route setting processing includes processing of setting a parking route for parking the vehicle in a first parking slot, and
the branching setting processing includes processing of setting a branching point on the parking route and setting a branching route for parking the vehicle in a second parking slot from the branching point, and
in the automatic parking processing, the parking support program causes the computer to further execute:

processing of receiving a change instruction operation for changing a target parking slot while the automatic parking of the vehicle is performed along a first parking route, and processing of performing the automatic parking of the vehicle along the branching route when the change instruction operation is detected in the processing of receiving the change instruction operation.

Advantageous Effects of Invention

According to the present disclosure, it is possible to change the target parking slot and automatically park in the new target parking slot without requiring visual recognition or operation on the screen, and without stopping during the procedure.

DESCRIPTION OF EMBODIMENTS

Embodiment

Figure 1:
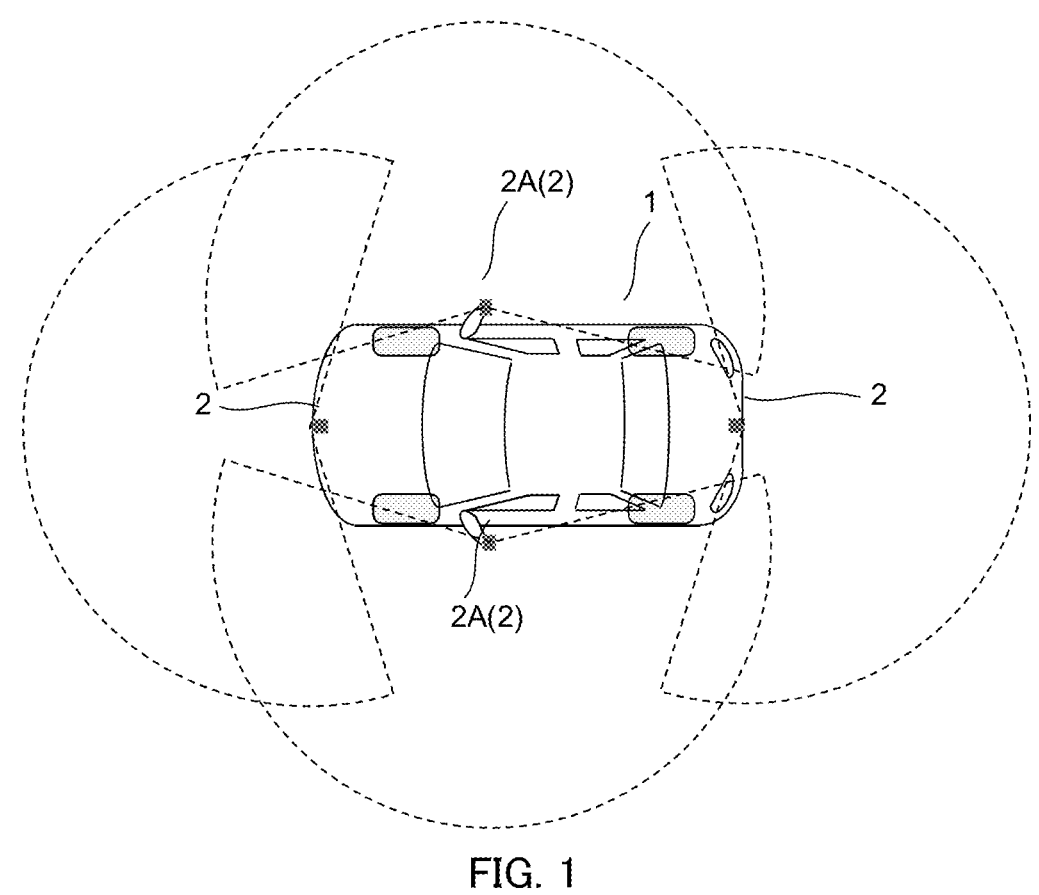
FIG. 1 is a diagram illustrating a vehicle to which a parking support apparatus according to the present embodiment is applicable.
Figure 2:
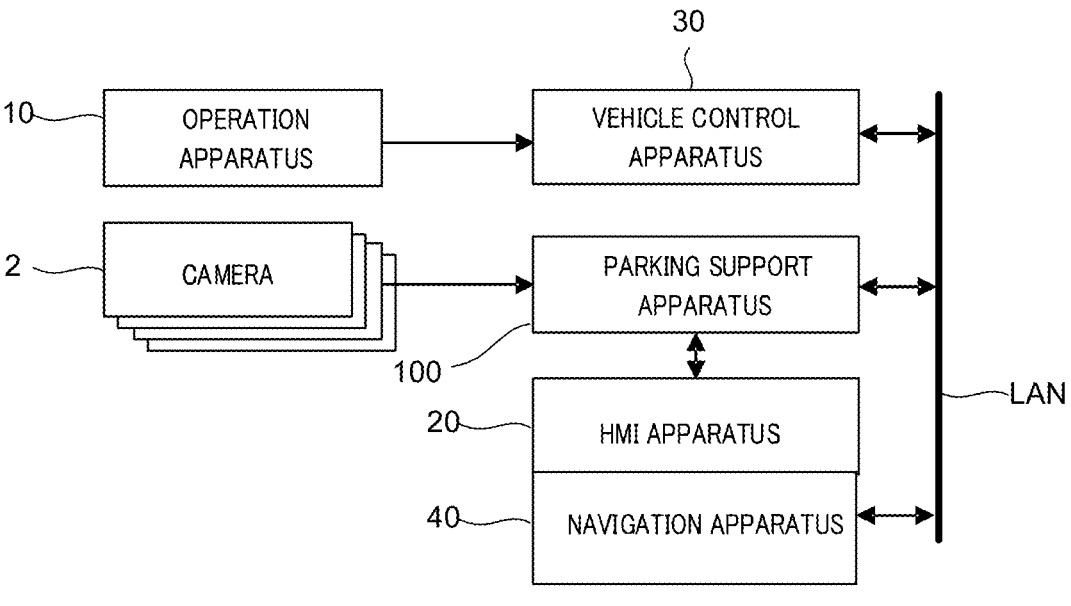
FIG. 2 is a diagram illustrating a configuration on a network of a system to which the parking support apparatus is applied.

Hereinafter, an embodiment of the present disclosure will be described in detail based on the drawings. FIG. 1 is a diagram for describing automatic parking with vehicle 1 to which parking support apparatus 100 according to the first embodiment of the present disclosure is applied. FIG. 2 is a diagram illustrating vehicle 1 to which parking support apparatus 100 according to the present embodiment is applicable.

Figure 3:
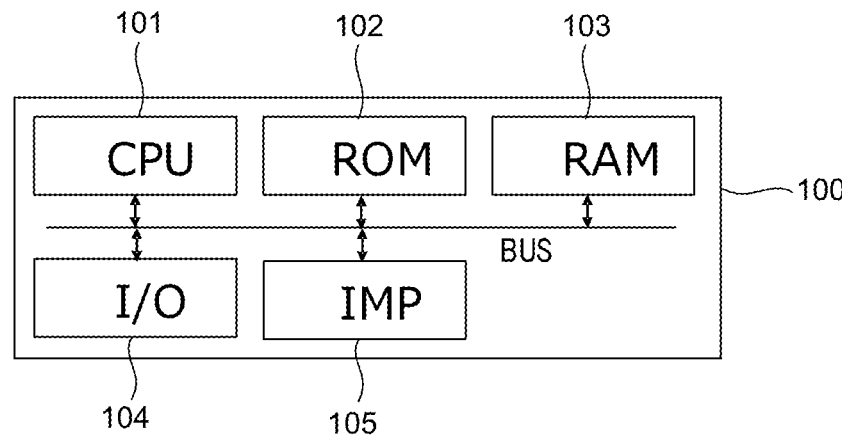
FIG. 3 is a block diagram illustrating a hardware equipped with a function of the parking support apparatus.

As illustrated in FIG. 1, vehicle 1 includes cameras 2 (see FIG. 2 and the like) for monitoring surroundings of the vehicle, and is configured to be able to perform automatic parking in a parking lot including one or more parking slots with parking support apparatus 100 illustrated in FIG. 3. The parking slot is a region between two parking slot lines approximately parallel to each other. Parking slot lines are disposed at an interval greater than the width of vehicle 1.

As illustrated in FIG. 1, cameras 2 are provided at four locations, namely front, rear, left and right, of the body of vehicle 1. Each camera 2 includes a fish eye lens, and has a field of view range of 180 degrees or greater in the horizontal direction (see the broken line). Each camera 2 is mounted with a depression angle to capture the road surface, and when the capturing range of the road surface is converted to the field of view in the horizontal direction, single camera 2 captures the road surface in the range of about 240 degrees. For example, the front wheels, the rear wheels, and the side surfaces of the vehicle body are captured in the captured images of side cameras 2A provided at the left and right of vehicle body.

Further, as illustrated in FIG. 2, vehicle 1 includes, in addition to four cameras 2, operation apparatus 10, human-machine interface (HMI) apparatus 20, vehicle control apparatus 30, and parking support apparatus 100. Operation apparatus 10 is configured to be manually operated by a driver (passenger), and includes a physical switch on a panel of the driver's seat, a switch of a software form displayed on the touch panel, and apparatuses for the driving operation such as a steering wheel, a pedal and a gear. HMI apparatus 20 is used as an HMI for the passenger to perform input operation to parking support apparatus 100, such as a touch panel of navigation apparatus 40 provided in vehicle 1, for example. The touch panel may be included in operation apparatus 10, and various switches disposed at the driver's seat may be included in operation apparatus 10, and therefore, operation apparatus 10 and HMI apparatus 20 may overlap each other.

Vehicle control apparatus 30 includes a central processing unit (CPU), read only memory (ROM), random access memory (RAM), and an input and output circuit (not illustrated). When the passenger operates operation apparatus 10, vehicle control apparatus 30 receives the operation. In the normal driving mode, vehicle control apparatus 30 drives the motor (not illustrated) in accordance with the operation information to control the steering angle and the vehicle speed, and outputs the operation information and vehicle information, such as information on the steering angle and information on the vehicle speed, to the local area network (LAN: in-vehicle LAN or the like). When the mode changes to a parking support mode, vehicle control apparatus 30 receives instructions on the speed and the steering angle from parking support apparatus 100 through LAN, and controls the speed and the steering angle in accordance with the instructions.

Vehicle control apparatus 30 monitors the behavior of operation apparatus 10, and thus parking support apparatus 100 acquires the operation information on operation apparatus 10 through LAN. The passenger can operate parking support apparatus 100 through HMI apparatus 20. Parking support apparatus 100 may receive the location information of vehicle 1 output by navigation apparatus 40 via the LAN, or may directly acquire it from navigation apparatus 40. Cameras 2 constantly output captured images to parking support apparatus 100, and parking support apparatus 100 generates and outputs a display image indicating the surroundings of the vehicle from the captured images even when parking support is not performed. Further, the above-described touch panel also functions as a display for outputting the display image generated by parking support apparatus 100, and thus parking support apparatus 100 and HMI apparatus 20 are directly connected to each other. Parking support apparatus 100 may directly receive information on the operation performed on the touch panel, or may receive the information through LAN. In addition, parking support apparatus 100 can receive via the LAN the location information of vehicle 1 output by navigation apparatus 40.

The functions of parking support apparatus 100 may be implemented in the hardware illustrated in FIG. 3. Parking support apparatus 100 includes CPU 101, ROM 102, RAM 103, input and output interface (I/O) 104 and image processor (IMP) 105. Parking support apparatus 100 may be a computer that connects the elements through a bus. In addition, a plurality of elements may be housed in one chip, or one element may be composed of a plurality of chips. The bus may not be a single bus, but may be a combination of buses of a plurality of types. For example, CPU 101, ROM 102, RAM 103 and IMP 105 housed in one chip may be connected by a parallel bus, and I/O 104 composed of a plurality of chips may be connected by a serial bus to the chip housing CPU 101 and the like.

CPU 101 controls the entire parking support apparatus 100. ROM 102 is an electrically rewritable memory, and stores the program to be executed by CPU 101 and functions as a nonvolatile data storage region to retain the data and the like even when the power of parking support apparatus 100 is turned off. RAM 103 is used for temporary storage as the work area of CPU 101. For example, data that only needs to be temporarily stored such as the latest peripheral image is stored in RAM 103. RAM 103 has the capacity to store a plurality of peripheral images. IMP 105 is a processor that enhances processing performance by specializing in image processing, and executes processing of image acquirer 130, parking slot detector 140, and notifier 180 illustrated in FIG. 4.

Figure 4:
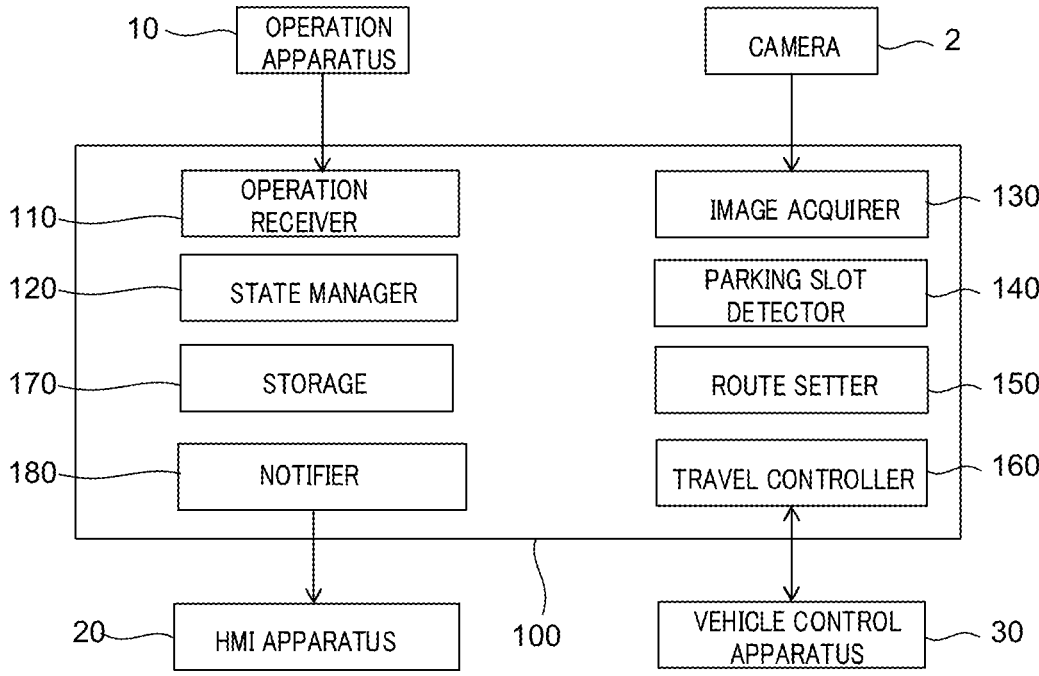
FIG. 4 is a block diagram illustrating the parking support apparatus.

The above-described camera 2 outputs captured camera images to parking support apparatus 100 at all times. Parking support apparatus 100 generates, from the camera image, display images representing the surroundings of vehicle 1 even when not performing parking support. As illustrated in FIG. 4, parking support apparatus 100 includes operation receiver 110, state manager 120, image acquirer 130, parking slot detector 140, route setter 150, travel controller 160, storage 170, and notifier 180.

Operation receiver 110 receives information on operation (including a driving operation) indicating an operation by the passenger.

State manager 120 manages the states of the parking support in accordance with the operation information and the states of the vehicle. The control from the activation of parking support apparatus 100 to the completion of the automatic parking is executed by transitioning the states according to the transition conditions defined in advance for each state managed by state manager 120 and executing the processing defined for each state. The states of the parking support may be set, for example, as state 0 to state 9 as described below.

State 0 is a stopped state, in which vehicle 1 is stopped. State 1 is a traveling state in which vehicle 1 is traveling and has not detected a parking slot. State 2 is a detecting state in which vehicle 1 is traveling and detecting the parking slot. State 3 is a detected state in which a parking slot is detected. State 4 is a setting state in which a route is set. State 5 is a reception state, in which a parking instruction is received.

State 6 is an inquiry state in which the approval action for automatic parking is accepted. State 7 is a self-driving state in which automatic parking is being performed. State 8 is a response state, in which the route is changed. State 9 is a completion state in which automatic parking is completed.

The above states are examples. In the examples described above, a parking slot is detected while vehicle 1 is traveling, but the parking slot detection may also be started while vehicle 1 is stopped. An operation by the passenger may be accepted in state 0 (stopped state), and the operations from route setting (state 4) to automatic parking approval (state 6) may be executed while vehicle 1 remains stopped. The present application is characterized by the behavior of a vehicle after the automatic parking has started, and therefore, any behavior and state configurations before the automatic parking starts may be optional.

Image acquirer 130 acquires camera images and generates peripheral images representing the surroundings of vehicle 1. The peripheral image may be a bird's-eye view obtained by projecting a camera image on the road surface, or an image of another format, or, a camera image as it is. In the present embodiment, the peripheral image is a bird's-eye view.

Parking slot detector 140 extracts white lines from the peripheral image. Next, parking slot detector 140 generates pairs of white lines from the extracted white lines, evaluates these pairs, and determines whether they meet the conditions for a parking slot. For example, when parking slot detector 140 detects a pair of white lines in the peripheral image, parking slot detect 140 determines that the region between the two white lines is a region where vehicle 1 can be parked provided that the following three conditions are satisfied: the two white lines are parallel to each other on the road surface, the two white lines are longer than the vehicle length, and the distance between the two white lines is greater than the vehicle width. Parking slot detector 140 outputs the coordinates of the four corners of a rectangle (that is, a parking slot) with the pair of white lines as the long sides. These coordinates are relative coordinates based on the position of the vehicle when the peripheral image is captured. In the case where vehicle 1 moves, the absolute coordinates of the parking slot can be obtained by correcting the movement amount of vehicle 1.

When viewed from the passage side, a part of the white line of a parking slot in which a vehicle is parked is hidden by the parked vehicle, and thus, parking slot detector 140 does not detect this parking slot. That is, all the parking slots detected by parking slot detector 140 are vacant parking slots. Since a parking slot with a parked vehicle is not a target for automatic parking and is not detected, the parking slot detected by parking slot detector 140 will simply be referred to as a parking slot in the following description.

Further, parking slot detector 140 may detect a plurality of parking slots simultaneously. In that case, the target parking slot is the one selected by the passenger from among the plurality of parking slots, or the one selected by state manager 120 in accordance with a predetermined criterion.

Route setter 150 sets the target parking position in the center of the target parking slot and sets a parking route from the current position to the target parking position such that the vehicle becomes parallel to the long side of the target parking slot when parked at the target stopping position. Specifically, route setter 150 configures the parking route by combining a straight section and a curved section. The curved section is composed of an arc or a combination of arcs. When the turning radius of the arc or the set value of the steering angle is determined, the curvature of the curved section is determined. Additionally, when the length of the arc or the central angle of the arc is determined, the distance to traverse the curved section is determined. Further, when the length of the straight section is determined, the set value for the entire route is determined. That is, the processing of route setting may be described as dividing the route into sections and setting a set value for each section.

Travel controller 160 controls the steering angle and the vehicle speed such that vehicle 1 travels along calculated parking route. More specifically, when the section in which the vehicle is traveling is a straight section, travel controller 160 sets the target value for the steering angle to 0 degrees, and when the section in which the vehicle is traveling is a curved section, travel controller 160 sets the steering angle corresponding to the turning radius as the target value for the steering angle. The target value of the vehicle speed may be a constant value, for example, 5 km/h. More specifically, travel controller 160 outputs the instruction values of the steering angle and the vehicle speed to vehicle control apparatus 30 on the basis of the target values of the steering angle and the vehicle speed. The instruction value is a value obtained by applying feedback correction to the target value. Travel controller 160 calculates actual measured values of the steering angle and the vehicle speed based on the data output from vehicle control apparatus 30. For example, the actual measured value of the vehicle speed is calculated from a measured value of the rotational frequency of the wheel and the circumference length data of the wheels. The actual measured value of the steering angle may be the measured value obtained from the steering apparatus, or may be calculated based on the inner wheel difference calculated from the difference in rotational frequencies of the plurality of wheels. When there is a difference between the target value and the actual measured value, travel controller 160 corrects the instruction values of the steering angle and the vehicle speed such that the measured values of the steering angle and the vehicle speed are the same as the instruction values of the steering angle and the vehicle speed. That is, travel controller 160 performs feedback control on the steering angle and vehicle speed of vehicle 1.

Travel controller 160 tracks the position and orientation of vehicle 1 during travel based on the calculated actual measured values of the steering angle and vehicle speed, and adjusts the target values of the steering angle and vehicle speed accordingly. For example, when the vehicle travels through a curved section and then covers the set distance, the controller determines that the curved section has ended and changes the target value for the steering angle to 0 degrees. Further, travel controller 160 calculates the travel trajectory of vehicle 1 based on the actual measured values of the steering angle and the vehicle speed during automatic traveling or manual traveling. The travel trajectory may be calculated in the format of movement information in which the movement distance, movement direction, and vehicle body angle are recorded for each unit time. The format of the movement information is not limited to this and may also be, for example, in the format of coordinate information recorded for each unit time.

During automatic travelling, travel controller 160 compares the parking route set by route setter 150 and the travel trajectory represented by the movement information and corrects the steering angle such that the travel trajectory follows the parking route. For example, when vehicle 1 moves backward while turning at a steering angle and the travel trajectory goes outside the parking route as viewed from the turning center point, travel controller 160 increases the instruction value of the steering angle to reduce the turning radius. In this manner, the travel trajectory of vehicle 1 is reset toward the parking route.

In automatic parking, it is sufficient to travel the parking route set automatically with the steering angle being automatically controlled. Therefore, travel controller 160 may be configured to control only the steering automatically, while allowing the passenger to control the vehicle speed. For example, travel controller 160 may suppress the acceleration of vehicle 1 only when the vehicle speed exceeds 5 km/h, allowing the passenger to park at a preferred vehicle speed when the vehicle speed is 5 km/h or less. In the present embodiment, automatic parking is performed by automatic travelling (both steering angle and vehicle speed are automatically controlled), but it may also be performed by automatic steering alone.

Storage 170 temporarily stores the input data and output data of processing performed by each section of parking support apparatus 100 so as to assist the processing of each section. For example, storage 170 stores image data of the front camera acquired by image acquirer 130 such that parking slot detector 140 can refer to it. In addition, storage 170 stores the location information of the parking slot detected by parking slot detector 140 such that route setter 150 can refer to it. Further, storage 170 stores the parking route calculated by route setter 150 such that travel controller 160 can refer to it. Further, storage 170 stores the time when the front camera image is captured, the time when vehicle 1 makes a turning motion, the time when vehicle 1 reaches the center line of the parking slot and starts traveling straight, and other relevant times. The storage also stores how far vehicle 1 has traveled since that times. Thus, even when vehicle 1 changes its position moment by moment, the position of vehicle 1 with respect to the parking slot can always be identified. That is, the processing performed by each section of parking support apparatus 100 is organically combined with the other processing in storage 170.

Notifier 180 generates a display image on the basis of a camera image or a peripheral image. The display image may be a bird's-eye view of the surroundings of vehicle 1 as viewed from above. That is, notifier 180 may output a bird's-eye view image as a display image.

Notifier 180 displays messages and diagrams in a superimposed manner on a display image in response to a request of state manager 120. For example, at the start of automatic parking, notifier 180 may display a semi-transparent rectangle representing the position of the parking slot detected by parking slot detector 140 to be superimposed on a bird's-eye view image, and display the route from the own vehicle to the target parking position calculated by route setter 150 as a dotted line.

The message may be read aloud as well as displayed on the image. Alternatively, the message may be output only by means of sound. More specific details is as follows: state manager 120 designates one predetermined text and makes a command to output it, and in response, notifier 180 generates an image of a character string corresponding to the specified text, superimpose the image on the display image, and outputs the resulted image to HMI apparatus 20; and at the same time, notifier 180 outputs sound data stored with the texts, in combination with the display image, to HMI apparatus 20. In this manner, the passenger can receive messages even without looking at HMI apparatus 20.

Figure 5:
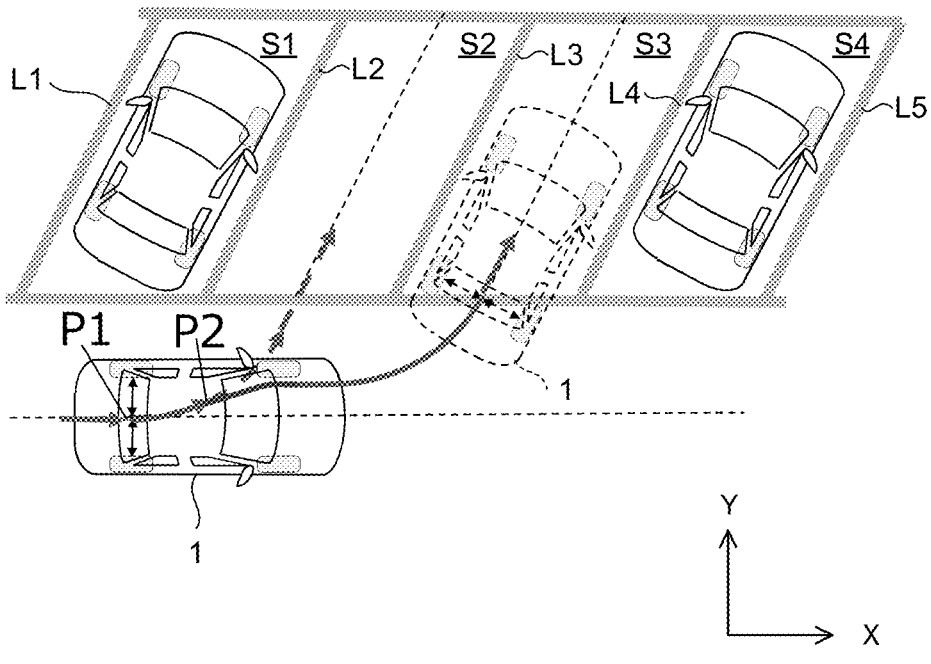
FIG. 5 is a diagram for describing a parking example by forward parking using the parking support apparatus.

Next, the details of the automatic parking function in parking support apparatus 100 will be described. FIG. 5 is a diagram illustrating a parking example of forward parking in parking support apparatus 100 according to the present embodiment. In the description of FIG. 5 and the like, an orthogonal coordinate system (X, Y) is used, and the same orthogonal coordinate system (X, Y) is used in the drawings to be described below. In the orthogonal coordinate system, the X-direction indicates the left-right direction, and the Y-direction indicates the up-down direction.

The example of FIG. 5 illustrates a parking lot where four parking slots S1 to S4 are disposed in this order from the – side in the X direction. Parking slot S1 is a parking slot between parking slot lines L1 and L2, parking slot S2 is a parking slot between parking slot lines L2 and L3, parking slot S3 is a parking slot between parking slot lines L3 and L4, and parking slot S4 is a parking slot between parking slot lines L4 and L5. The example of FIG. 5 illustrates a case where the available parking slot is S2 and S3, and vehicle 1 drives forward from the – side to the + side in the X direction in the passage facing four parking slots S1 to S4. Further, each parking slot line is inclined at approximately 60 degrees relative to the course that goes toward the + side in the X direction.

In FIG. 5, the trajectory of a representative point of vehicle 1 is shown as the traveling route. Here, the midpoint between the two rear wheels of vehicle 1 is referred to as the point representing the position of vehicle 1 (the representative point of vehicle 1). In the route illustrated in FIG. 5, when vehicle 1 is moving straight in the passage, the automatic parking with parking slot S2 as the target parking slot is initiated, and the turning toward parking slot S2 starts at position P1. However, at position P2, the target parking slot is changed from parking slot S2 to parking slot S3, and the automatic parking continues. P1 is a position corresponding to parking slot S1 and is the turning start position when performing forward parking into parking slot S2. P2 is a position on the route of the automatic parking to parking slot S2, and vehicle 1 changes its course to a direction parallel to the passage from P2. Hereinafter, a point at which the parking route changes to another route from a middle of the parking route will be referred to as a branching point, as in the case of P2 (herein, a "middle of a parking route" is referred to a point between both end of the parking route). For example, P2 is a branching point where the route to parking slot S3 branches from the route to parking slot S2.

In the case of vehicle 1 moving straight along the passage, when parking support apparatus 100 automatically selects the target parking slot and initiates automatic parking, for example, parking slot S2 (which is the parking slot with the shortest parking route among the settable parking slots) is selected. In this case, vehicle 1 soon starts turning from the turning start position P1 toward parking slot S2, but the parking slot that the passenger intends may be S3, not S2.

As described above, examples of cases where the passenger intends to park in a next parking slot rather than the nearest parking slot include situations where there is an attendant in the passage instructing the passenger to park in parking slot S3, which is located behind parking slot S2, or where there is a following vehicle behind vehicle 1, and the passenger is considering allowing the following vehicle to park in parking slot S2. Other examples include situations where the passenger in the passenger seat finds S3 more convenient than S2 when getting off, or when there are obstacles such as fallen objects or puddles in parking slot S2.

In a case where the passenger considers that S3 is better as the parking position and realizes that the target parking slot selected by parking support apparatus 100 is S2 before the start of automatic parking, it is possible to change the target parking slot before the start of automatic parking. However, since vehicle 1 travels straight until it starts turning at the rotation start position P1 after the automatic parking has begun, it is unlikely that the driver will realize that the target parking slot is S2 based on the behavior of vehicle 1 before the automatic parking starts. Accordingly, in order to allow the passenger to change the target parking slot after the start of automatic parking to the intended parking slot, the target parking slot after the start of automatic parking can be changed by the following means.

For example, when the automatic parking is initiated by the parking slot detection function that has been activated during the travel of vehicle 1 and parking slots S2 and S3 are detected, and when the turn signal lever operation to the left is used as a trigger to start the automatic parking, the control apparatus may accept the blinker lever operation, which is the same means as the start instruction for the automatic parking, as the instruction for changing the target parking slot. For example, when an operation in the direction opposite to the start instruction for the automatic parking is detected, the target parking slot may be changed. Specifically, when the automatic parking is initiated upon detecting a left blinker lever operation, parking support apparatus 100 may change the target parking slot from S2 to S3 when a right blinker lever operation is detected during the execution of the automatic parking.

Further, in a case where the automatic parking is started in response to the steering wheel operation to the left as the trigger, the parking support apparatus may accept the steering wheel operation, which is the same means as the start instruction of the automatic parking, as the instruction for changing the target parking slot. For example, when a rightward steering wheel operation is detected during the execution of the automatic parking, parking support apparatus 100 may change the target parking slot from S2 to S3.

Since such operations of the blinker lever and the steering wheel can be executed while the passenger visually checks the surroundings, these operations are preferable because they do not interfere with monitoring the surroundings of vehicle 1, as compared to a case where the passenger is required to operate the touch panel while vehicle 1 is traveling. However, there are cases where the passenger in the passenger seat determines the parking position or notices a problem with the parking slot. Accordingly, as a means for changing the parking position, in addition to the operation of a blinker lever or a steering wheel, a touch panel operation that can be executed by a passenger in the passenger seat may also be included.

For example, when automatic parking is initiated by the operation of the touch panel while vehicle 1 is stopped, the operation of the touch panel during the execution of the automatic parking may involve changing the target parking slot. Specifically, when a touch operation for parking slot S2 displayed on the screen of the touch panel is detected, parking support apparatus 100 starts automatic parking. During the execution of the automatic parking, when a touch operation for parking slot S3 on the screen is detected, parking support apparatus 100 may change the target parking slot from S2 to S3.

Figure 6:
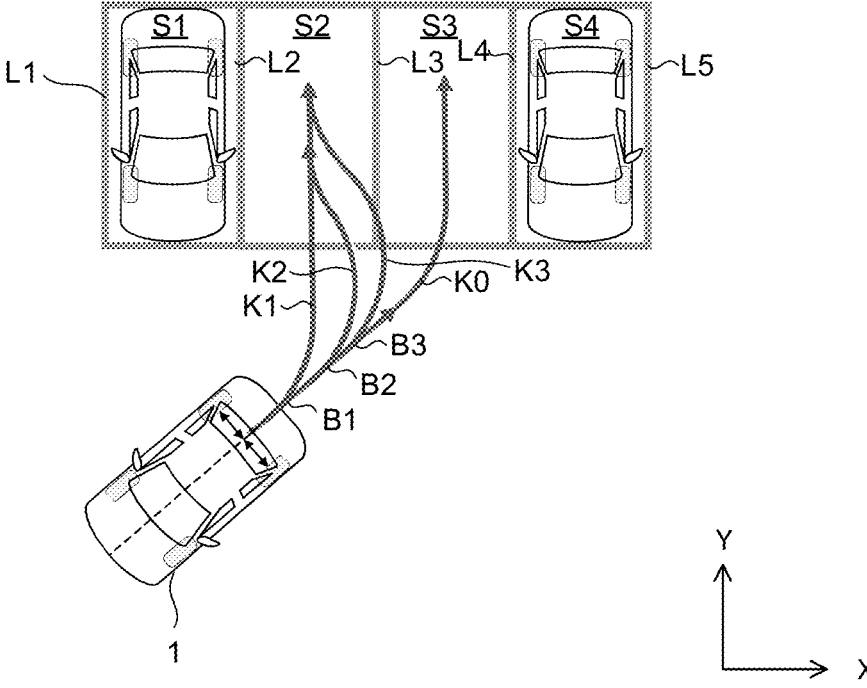
FIG. 6 is a diagram for describing a parking example by backward parking using the parking support apparatus.

FIG. 6 is a diagram for describing an example of automatic parking by backward parking in parking support apparatus 100 according to the present embodiment. In the example illustrated in FIG. 6, a parking lot with four parking slots S1 to S4 is shown, similar to FIG. 5. However, in FIG. 6, each parking slot is oriented perpendicular to the X direction.

Further, K0 to K3 in FIG. 6 are examples of routes for automatic parking. Route K0 is a route to parking slot S3, and is a route when the target parking slot is not changed during the parking. Route K1 is a route to parking slot S2, branching off from route K0 at branching point B1. Route K1 is a route when the target parking slot is changed at an early stage. Route K2 is a route to parking slot S2, and it branches off from route K0 at branching point B2. The position of branching point B2 is closer to parking slot S3 than branching point B1 is, and route K2 is the route when the target parking slot is changed at a slightly later point. Route K3 is a route to parking slot S2, and is a route when route K0 branches at branching point B3. Since route K3 is a route when the target parking slot is changed at a later point than in the case of route K2, the position of branching point B3 is closer to parking slot S3 than branching point B2 is. Since routes K1 to K3 are branched from route K0, they may be referred to as branching routes.

For example, route setter 150 of parking support apparatus 100 sets route K0 to parking slot S3 before the vehicle starts reversing when performing automatic parking to parking slot S3. Then, after the vehicle starts reversing, travel controller 160 of parking support apparatus 100 controls the steering angle and vehicle speed so that vehicle 1 follows route K0. Next, consider the case where the target parking slot is changed while vehicle 1 is traveling along route K0. Assuming that route setter 150 sets a route for parking vehicle 1 in parking slot S2 with the position of vehicle 1 at that time as the starting point, the travel of vehicle 1 continues even while the route setting process is being performed, causing vehicle 1 to pass the starting point of the route before the route setting is completed. That is, in the conventional route setting process, where a route is set for parking in the parking slot with the current position of vehicle 1 as the starting point, it is not possible to set a branching route while continuing to travel.

When the target parking slot is changed, it is possible to set a branching route in a conventional route setting process by stopping vehicle 1 at the stopping position and setting the route to park vehicle 1 in another parking slot with the stopping position as the starting point. However, when vehicle 1 stops in the middle of the automatic parking process, the time required for parking increases, thereby reducing convenience. Further, route setting is started after the vehicle has stopped and the starting point of the route has been determined, so the time required for automatic parking increases due to the route setting.

As a means to avoid this problem, a branching process function for setting a branching route is implemented in route setter 150, and the branching route is set by the branching process function. The process of setting this branch will be referred to as branching route setting or branching process. The branching process is as follows. For example, when the vehicle is located at point B1 and the target parking slot is changed, route setter 150 of parking support apparatus 100 sets a point on route K0, for example, point B3 (which is ahead of the current position of vehicle 1 in the direction of travel) as a branching point, and sets route K3 (which branches from branching point B3 and leads to parking slot S2). The distance from the current position of vehicle 1 to branching point B3 may be, for example, 3 meters. While route setter 150 is setting route K2, travel controller 160 causes vehicle 1 to travel along route K0. As long as the setting of route K2 has been finished when vehicle 1 reaches branching point B3, the distance from the current position of vehicle 1 to branching point B3 may be determined according to the time required for the route setting, or the vehicle speed of vehicle 1 may be controlled such that vehicle 1 does not reach branching point B3 until the setting of route K2 is finished.

In this manner, the problem of the vehicle temporarily stopping and the passenger being made to wait while the route is being set can be avoided. However, several problems still remain.

First, when the branching process is started after the passenger instructs a change of the target parking slot, vehicle 1 does not change its course until the branching process is completed. This may cause the passenger to misunderstand that the instruction for changing the target parking slot has not been accepted, leading to unnecessary or excessive operations. In particular, when the instruction for changing the target parking slot is given by operating the steering wheel, there is a possibility that the passenger may excessively turn the steering wheel, causing the course of vehicle 1 to deviate significantly from route K0.

Further, when the branching point is positioned close to the parking slot, the time required for parking may increase. For example, when the target parking slot is changed when vehicle 1 is at point B2, the branching point set by route setter 150 is closer to parking slot S3 than point B3 is. In this case, it is not possible to park in parking slot S2 without turning the vehicle more than once at that position. The route may require the vehicle to stop once, then advance, stop again, and then back up toward parking slot S2. Consequently, the required time may be longer than when the route were set while the vehicle is stopped at point B2.

Accordingly, it is preferable to perform a branching process to set branching routes before starting the automatic parking. Specifically, branching points B1 to B3 should be set separately along the route K0 in advance. When the target parking slot is changed, parking support apparatus 100 causes the route to branch at any one of the branching points B1 to B3 (that is, follows any one of routes K1 to K3) and automatically parks vehicle 1 in parking slot S2. By setting the starting point (i.e., the branching point) of the route to be branched in advance, route setter 150 of parking support apparatus 100 can preset the routes, thereby eliminating the need to stop for route setting.

When the target parking slot is changed, parking support apparatus 100 may select one of the routes K1 to K3 based on the position of vehicle 1 at the time of the change. For example, when the target parking slot is changed before reaching branching point B1, parking support apparatus 100 selects route K1. Further, when the target parking slot is changed after passing branching point B1 and before reaching branching point B2, parking support apparatus 100 selects route K2. Further, when the target parking slot is changed at a position after passing branching point B2 and before reaching branching point B3, parking support apparatus 100 selects route K3. In a case where the target parking slot is changed beyond branching point B3, parking support apparatus 100 may, for example, cause vehicle 1 to reverse to branching point B3 along route K0 and then travel along route K3 from branching point B3.

As described above, when there is an instruction for changing the target parking slot, the upper limit of the time from when the passenger instructs the change of the target parking slot to when vehicle 1 changes the course can be minimized by setting the branching points separately and changing the course at the nearest branching point in the traveling direction. In the example illustrated in the drawing, the number of branching points is three. However, by increasing the number of branching points and shortening the intervals, it becomes possible to perform branching at a closer branching point. This allows for a reduction in the time from the change instruction of the target parking slot to the course change.

Figure 7:
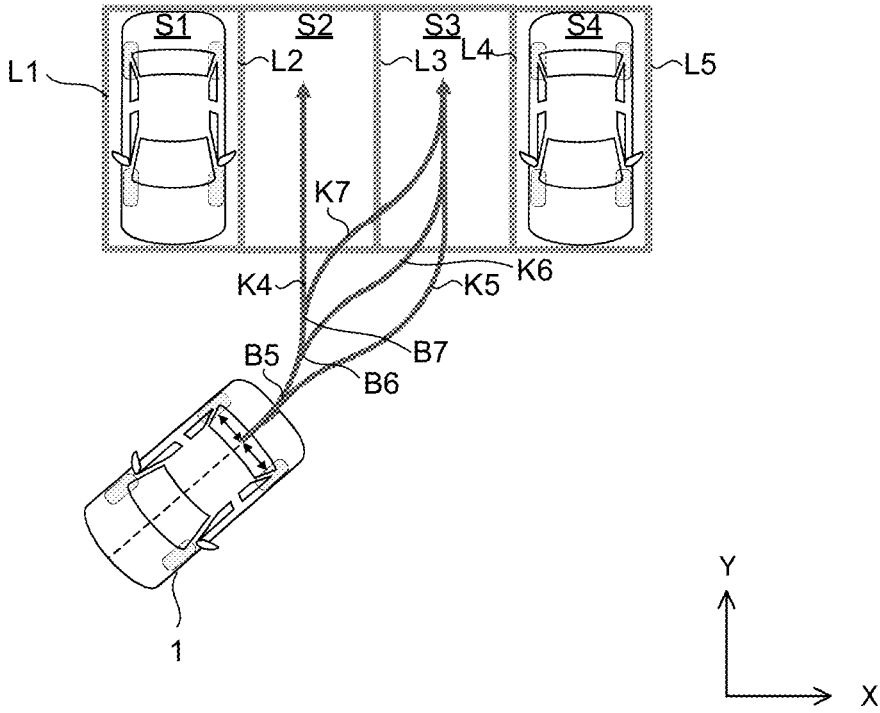
FIG. 7 is a diagram for describing a parking example by backward parking using the parking support apparatus.

Further, FIG. 7 illustrates another example of automatic parking by backward parking in parking support apparatus 100. In FIG. 7, the target parking slot at the start of the automatic parking is S2, and the target parking slot after the change is S3. That is, in FIG. 6, the target parking slot is changed to the side closer to the start position, whereas in FIG. 7, the target parking slot is changed to the side farther from the start position.

K4 to K7 in FIG. 7 are examples of routes for automatic parking. Route K4 is a route to parking slot S2, and a route when the target parking slot is not changed during the parking. Route K5 is a route to parking slot S3, and it branches from route K4 at branching point B5 when the target parking slot is changed at an early stage. Route K6 is a route to parking slot S3, branching from route K4 at branching point B6 when the target parking slot is changed at a slightly later point. Since route K6 is a route when the target parking slot is changed at a later point than in route K5, the position of branching point B6 is closer to parking slot S2 than branching point B5 is. Route K7 is a route to parking slot S3, and it branches from route K4 at branching point B7 when the target parking slot is changed at an even later point. Since route K7 is a route when the target parking slot is changed at a later point than route K6, the position of branching point B7 is closer to parking slot S2 than the position of branching point B6 is. Since routes K5 to K7 are branched from route K4, they may be called branching routes.

In a case where parking support apparatus 100 detects two adjacent parking slots, parking support apparatus 100 may optimize an initial parking route (route K0 in FIG. 6 and route K4 in FIG. 7) such that the passenger can easily recognize the target parking slot. For example, route K0 in FIG. 6 is a route where vehicle 1 proceeds straight from the start position of the automatic parking to the vicinity of the entrance of parking slot S3, whereas route K4 in FIG. 7 is a route where vehicle 1 immediately turns at the start position of the automatic parking.

As described above, by setting the parking route so that the movement of vehicle 1 differs immediately from the start of automatic parking, the passenger can recognize at an early stage whether the target parking slot is S2 or S3. That is, even when the passenger has not confirmed the target parking slot or has misunderstood the target parking slot, it is possible to make the passenger aware of whether the target parking slot is either S2 or S3 by the movement of vehicle 1 immediately after the start of the automatic parking. For example, when the passenger is late in realizing that the target parking slot is not the intended one and the time to change the target parking slot is late, turning of the vehicle more than once is required, which can extend the time required from the start of the automatic parking to the completion of the parking. That is, by setting the route so that the target parking slot is recognized from the moment vehicle 1 starts moving, it is possible to avoid such a loss of time.

The initial parking route (route K0 in FIG. 6, route K4 in FIG. 7) may be optimized to extend the length of the straight section. In the example of FIG. 6, branching points B1 to B3 are located in the straight section of route K0, making it easier to set the starting point of each route. Further, in the example in FIG. 7, branching points B6 and B7 are located in the straight section of route K4, and the curved sections of route K6 and route K7 are in a relationship of parallel movement to each other. Thus, the set value (turning radius or central angle) of the curved section of route K6 can be applied to the setting of route K7.

Figure 8:
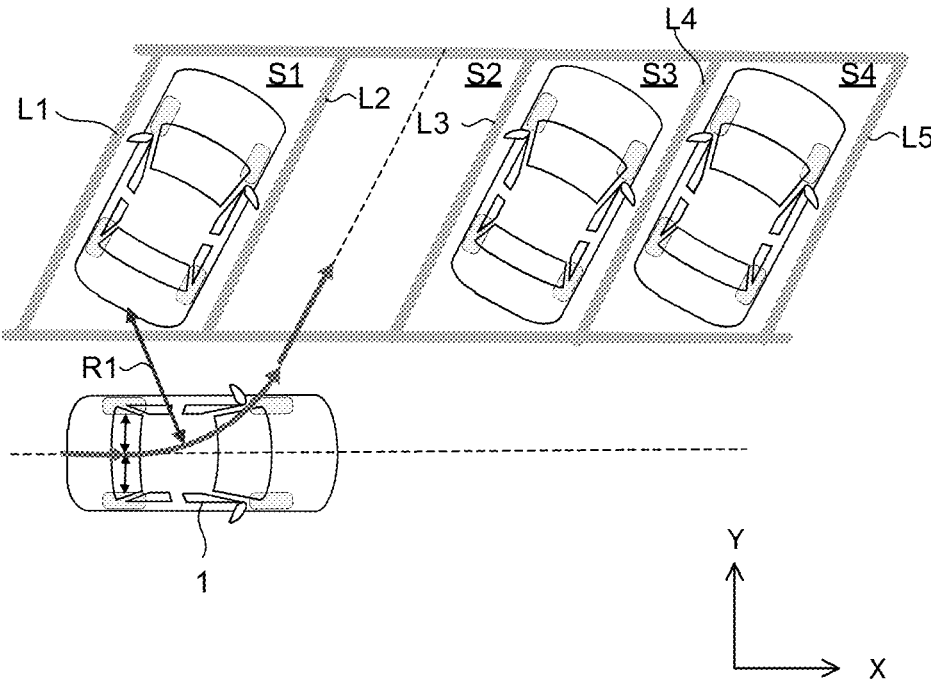
FIG. 8 is a diagram for describing a parking example by forward parking using the parking support apparatus.
Figure 9:
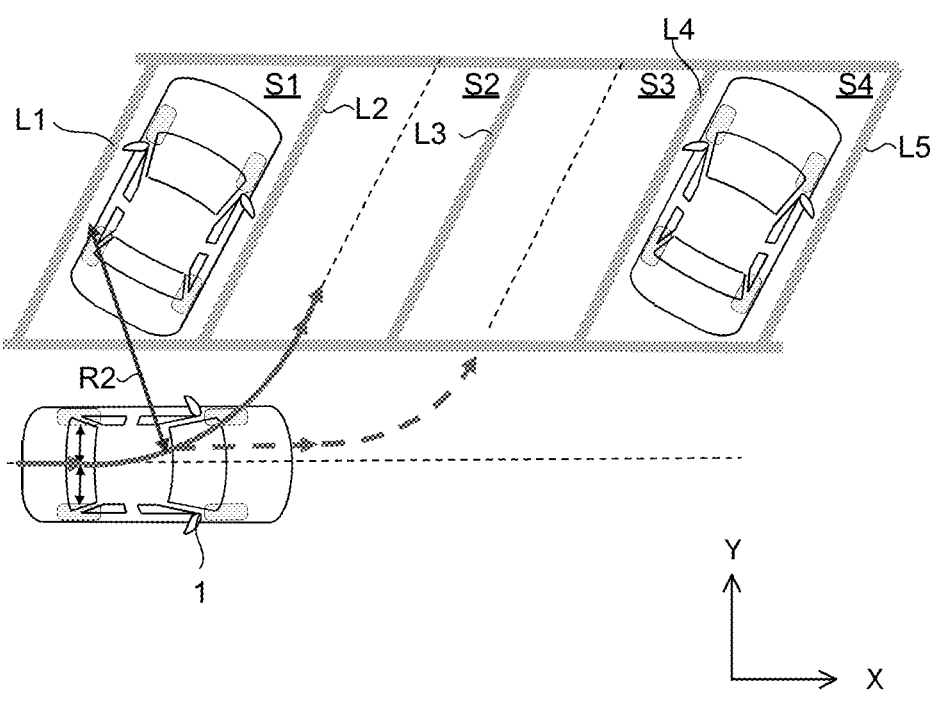
FIG. 9 is a diagram for describing a parking example by forward parking using the parking support apparatus.

Next, a case will be described where, during the travel of vehicle 1, the passenger instructs forward parking into the parking slot on the left side by operating the blinker lever, and the target parking slot is changed after the automatic parking has started. As in the parking lot illustrated in FIG. 5, the parking lot illustrated in FIGS. 8 and 9 has an angle of approximately 60 degrees formed by the directions of the parking slot and the passage (the X-direction). FIG. 8 illustrates an example where the only vacant parking slot is S2, while FIG. 9 illustrates an example where the vacant parking slots are S2 and S3.

Even in the case of forward parking, it is beneficial to devise the parking route so that the target parking slot can be identified early when there are a plurality of vacant parking slots. In FIG. 8, in a case where only parking slot S2 is detected, route setter 150 of parking support apparatus 100 sets the turning radius of the turning section, where vehicle 1 turns, to the standard turning radius R1. On the other hand, as illustrated in FIG. 9, when both parking slots S2 and S3 are detected and parking slot S2 is the target parking slot, route setter 150 may set the turning radius R2 of the turning section, where vehicle 1 turns, to be larger than the turning radius R1 of the case where only parking slot S2 is detected. Thus, the start of vehicle 1's turn into parking slot S2 begins earlier.

In this way, it is possible to make the passenger aware early that the target parking slot is S2 and not S3, thereby increasing the time available for the passenger to instruct a change in the parking slot. Further, when the turning radius is large, the acceleration felt by the passenger becomes smaller, making it easier to issue instructions for changing the parking slot. Furthermore, when the turning radius is large, vehicle 1 approaches the parking slot more slowly, making it possible to set the branching point of the route at a position further away from the parking slot, which is a safer position.

Figure 11:
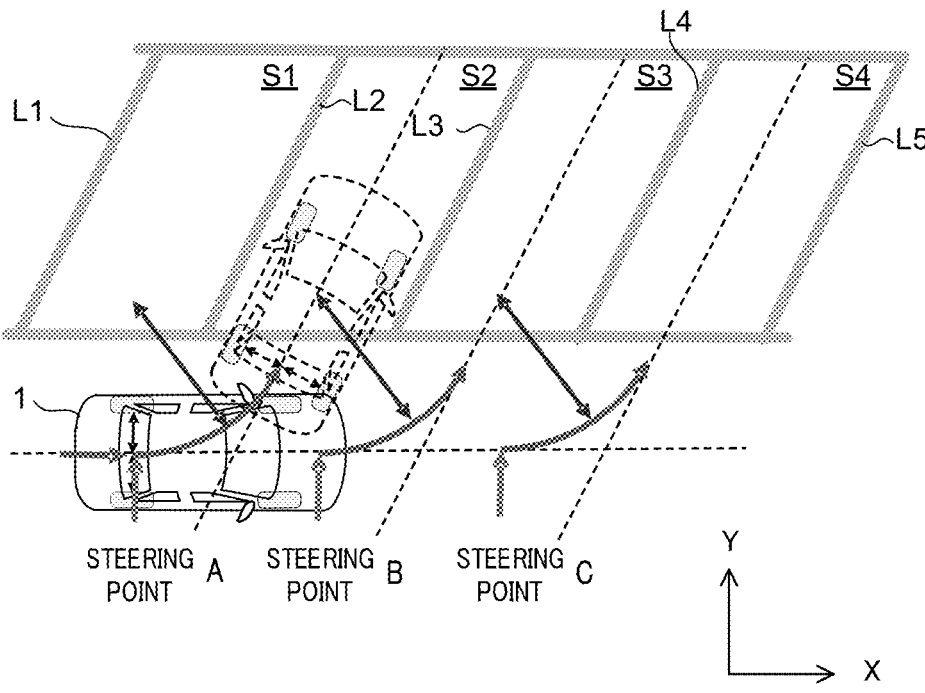
FIG. 11 is a diagram for describing a parking example by forward parking using the parking support apparatus.

Further, by improving the notification system that notifies the passenger of the parking action, the passenger can be made aware of the target parking slot earlier. For example, when there are a plurality of vacant parking slots as illustrated in FIG. 11, the notification may include the position of the target parking slot, such as "The vehicle will be parked in the nearer parking slot." Alternatively, the timing for notifying the parking action may be set earlier. For example, the apparatus may notify the passenger such that "the vehicle will turn to the left" at a timing earlier than the actual turning. The message or the timing of the notification may be changed depending on whether there is one vacant parking slot or a plurality of vacant parking slots. For example, when there is one vacant parking slot, the control apparatus may start outputting a voice message "The vehicle will turn left" one second before the start of the turn. When there are a plurality of vacant parking slots, the control apparatus may start outputting a voice message "The vehicle will turn left toward the nearer parking slot" three seconds before the start of the turn.

In this manner, it is possible to determine early that the target parking slot is S2, and when the parking slot that the passenger intends is S3, the passenger can instruct the change early. For example, when the change is instructed before reaching steering point A, the vehicle does not turn at steering point A and heads towards parking slot S3, allowing for smoother automatic parking.

Returning to FIGS. 6 and 7, the timing at which route setter 150 of parking support apparatus 100 performs route setting will be described. In the initial stage of automatic parking, the route (route K0 in FIG. 6, route K4 in FIG. 7)

must have its route setting completed before the automatic parking begins. However, for the branching routes (routes K1 to K3 in FIG. 6, routes K5 to K7 in FIG. 7), which from branching points set in a middle of the initial route, the timing for setting these routes can be adjusted as necessary. When a large number of routes are set in advance and the intervals between branching points are short, it is possible to change the route quickly in response to an instruction for changing the target parking slot, resulting in a satisfactory usability; however, this requires high processing capability. Accordingly, it may be configured to set all the branching routes before starting the automatic parking; however, when it is not possible to set all the branching routes beforehand, it may be configured to set a part of the branching routes before starting the automatic parking and to continue setting the remaining branching routes even after the automatic parking has started.

For example, in FIG. 6, when the target parking slot is changed before vehicle 1 reaches branching point B1, the automatic parking route will change from route B1 to route K1. In this case, routes K2 and K3 may remain unset until vehicle 1 reaches branching point B1. When an instruction for changing the target parking slot is given after vehicle 1 has passed the branch point B1 and before vehicle 1 has reached the branch point B2, it is sufficient that the setting of route K2 is completed before vehicle 1 reaches branching point B2, as the automatic parking route changes to route K2 at branching point B2. In this case, parking support apparatus 100 may control the vehicle speed so that the setting of route K2 is completed before vehicle 1 reaches branching point B2, or it may set the intervals between branching points based on the time required for route setting and the vehicle speed.

Further, route setter 150 of parking support apparatus 100 may set only one branching point and may set a branching route after the start of the automatic parking. For example, in FIG. 6, route setter 150 sets only the branching point B3 and sets only the route K3 after the start of the automatic parking. When the target parking slot is changed, the route branches from branching point B3 to route K3 regardless of when the change of the target parking slot is made. Route K3 only needs to be set before vehicle 1 reaches branching point B3. This allows the processing performance of the processing circuit to be kept lower compared to a scenario where routes K1 to K3 are set sequentially. That is, by reducing the number of branching points and routes, it is possible to lower the hardware costs.

When the number of branching points is reduced, the average time from when the passenger instructs a change of the target parking slot until the behavior of vehicle 1 changes becomes longer. Further, as described above, when the branching point and the branching route are not set in advance and are instead set when a change of the target parking slot is instructed, the time until the control apparatus branches may be evaluated as slow, as the time until the control apparatus branches may be longer in the same manner. Accordingly, when parking support apparatus 100 accepts a change of the target parking slot, parking support apparatus 100 may immediately notify that the instruction has been accepted and may subsequently notify that the course will change shortly. Thus, it is possible to enhance the passenger's impression.

Further, from the viewpoint of prioritizing power efficiency, it is most efficient to set only one route without setting the branching point or the branching route in advance, and to set the branching point when parking support apparatus 100 accepts a change of the target parking slot. However, when the position of the branching point is determined at the time of changing the target parking slot, it may not be possible to determine whether parking can be achieved without turning the vehicle more than once until the route is set, and thus an appropriate notification may not be given to the passenger. That is, there may be cases where turning of the vehicle more than once (and/or temporary stop) is necessary, but it is not possible to notify whether the turning of the vehicle more than once is required at the time of accepting the change of the target parking slot. Accordingly, route setter 150 may, for example, preset only branching point B3, start the route setting at the latest when automatic parking begins, and complete the setting of route K3 by the time vehicle 1 reaches branching point B3. When the target parking slot is changed before vehicle 1 reaches branching point B3, the control apparatus may notify that the route will branch at the time of reaching branching point B3. When the target parking slot is changed after vehicle 1 reaches branching point B3, the control apparatus may notify that the route will branch after returning to branching point B3. That is, when the branching point is set in advance, the presence or absence of a temporary stop can be notified to the passenger at the time the target parking slot is changed, even when the calculation of the branching route is not completed.

The parking slots to be set by route setter 150 of parking support apparatus 100 may be up to the second candidate among the parking slots that can be parked in without stopping during automatic parking. That is, route setter 150 sets a parking route for parking in the first candidate parking slot and a branching route for parking in the second candidate parking slot. Hereinafter, the present invention will be described with reference to FIG. 10.

Figure 10:
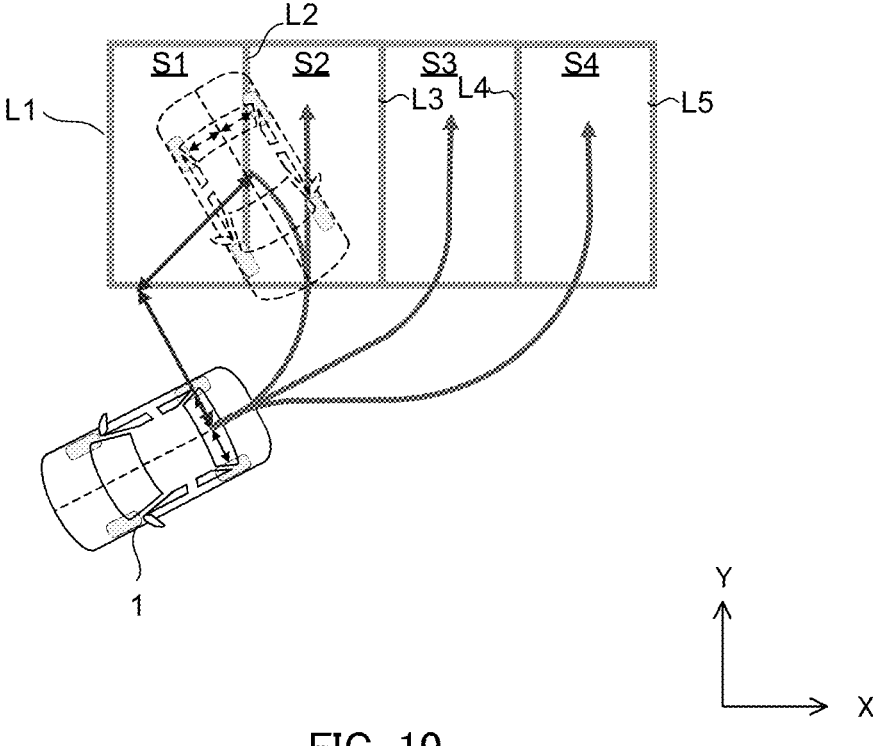
FIG. 10 is a diagram for describing a parking example by backward parking using the parking support apparatus.

For example, in the case of FIG. 10, vehicle 1 illustrated with a solid line can park in parking slots S2, S3, and S4 without any stopping during the parking, vehicle 1 cannot park in parking slot S1 without any stopping during the parking. The turning radius of vehicle 1 has a lower limit, which constrains the turning motion of vehicle 1. For example, even when vehicle 1, shown by the solid line in FIG. 10, turns at the minimum turning radius from its current position, vehicle 1 will reach the far end of parking slot S1 before the left and right rear wheels enter parking slot S1. Therefore, it is not possible to turn further reverse and align the vehicle body parallel to the parking slot line. In order for vehicle 1 illustrated with a solid line to park in parking slot S1, it is necessary to start performing the backward parking after first moving forward.

The change of the target parking slot after the automatic parking has started is characterized by the ability to complete parking in a short time without stopping during the parking. Therefore, it is not necessary to expand the target to include parking slots that require stopping during the parking. When the number of parking slots to be processed increases, the cost associated with the processing amount and processing time also increases. Additionally, when the vehicle stops during the procedure, the time required for parking does not significantly differ even when the route is set while the vehicle is stopped.

In the case of FIG. 10, parking support apparatus 100 may designate parking slot S2 as the first candidate and parking slot S3 as the second candidate when there is no instruction from the passenger. In a case where the instruction from the passenger is parking slot S3, parking support apparatus 100 may set parking slot S3 as the first candidate and set parking slot S2, which is closer to vehicle 1, as the second candidate among S2 and S4. There are cases in which the passenger wishes to park the vehicle in parking slot S4, but even when a situation where the occurrence probability is low is addressed, the expected effect is small, so it is better to avoid increasing costs.

Further, in the case of forward parking, the movement of vehicle 1 is also constrained by the minimum turning radius. For example, as illustrated in FIG. 11, steering points A, B, and C can be set corresponding to parking slots S2, S3, and S4, respectively. At these steering points, vehicle 1 pivots with the minimum turning radius, positioning the vehicle body in the center of the respective parking slot. For example, when vehicle 1 is made to turn with the minimum turning radius at that point, the position where vehicle 1 can enter the center of parking slot S2 is the steering point A.

In a case where vehicle 1 does not make a turn at steering point A and attempts to enter parking slot S2 after traveling in a straight line, due to the constraint of the minimum turning radius, the vehicle body does not fit into parking slot S2 unless the vehicle turns more than once in the middle of the parking route. In the same manner as with parking slot S3, other parking slots such as parking slot S4 cannot be parked correctly unless the vehicle turns more than once from a position beyond wheel steering points B and C. In the case of backward parking, the final stroke is started after the vehicle has temporarily stopped. In contrast, for forward parking, it is common for a vehicle to enter a parking slot without temporarily stopping. Therefore, even in automatic parking, a non-stop, speedy parking process is required. That is, in automatic forward parking, turning of the vehicle more than once is not permitted, and thus, the vehicle does not automatically park in a parking slot beyond the corresponding steering point.

For example, when the passenger instructs automatic parking after the vehicle passes through steering point A in a straight line and before reaches steering point B, parking support apparatus 100 starts automatic parking with parking slot S3 as the target parking slot, following the parking route in a straight line to steering point B and then turns vehicle 1 at steering point B. During vehicle 1 being advancing in the straight line towards steering point B, when the passenger instructs a change of the target parking slot to parking slot S4, parking support apparatus 100 switches the route of the automatic parking to a parking route in which the vehicle advances in a straight line to steering point C and starts to turn at steering point C to enter parking slot S4. However, when the passenger instructs a change of the target parking slot to parking slot S2 while vehicle 1 is traveling in the straight line towards steering point B, the vehicle would have already passed through steering point A. Therefore, even when the change to parking slot S2 is instructed after passing steering point A, it is not possible to park in parking slot S2 without turning the vehicle more than once (non-stop). That is, in forward parking, changing the target parking slot to a nearer parking slot is not effective; only changing the target parking slot to the next parking slot is effective.

As described above, in forward parking, it is possible to change the target parking slot to the next parking slot, but it is substantially impossible to change the target parking slot to a nearer parking slot. In order to adapt to this, parking support apparatus 100 may be configured to automatically select the target parking slot. For example, when automatic parking is instructed at a point beyond steering point A and before steering point B, parking support apparatus 100 automatically selects parking slot S3 as the target parking slot and starts the automatic parking. Then, in a case where there is an operation instructing the target parking slot change to parking slot S4, parking support apparatus 100 accepts the change of the target parking slot. However, in a case where there is an operation instructing the target parking slot change to parking slot S2, parking support apparatus 100 does not accept the change of the target parking slot.

For example, when the position is beyond steering point A but before steering point B, and the passenger lightly turns the steering wheel to the left, operation receiver 110 of parking support apparatus 100 accepts this as an instruction for automatic parking. Notifier 180 of parking support apparatus 100 then indicates, "The vehicle will be parked in the left parking slot. Please release the steering wheel." In response to this, when the passenger releases the steering wheel, parking support apparatus 100 starts automatically parking vehicle 1.

Releasing the steering wheel by the passenger is a procedure to ensure that automatic steering is not impeded and should be performed at the necessary timing as required. For example, when vehicle 1 is moving straight in a passage in a parking lot, and when the parking slot detection button is pressed by the passenger, parking support apparatus 100 may prompt the passenger to release the steering wheel and may start automatic steering. In this way, when the passenger does not perform the steering operation for maintaining the course, any steering wheel operation by the passenger can be accepted as an instruction to start automatic parking or to change the target parking slot. For example, when the action of lightly turning the steering wheel to the left is detected while automatic steering has been initiated, the control apparatus determines this as an instruction for automatic parking and starts the automatic parking. Notifier 180 then announces, "The vehicle will be parked in the left parking slot," and may cause vehicle 1 to turn to the left at steering point B.

After the vehicle begins turning at the steering point B, when the parking slot intended by the passenger is S4, lightly turning the steering wheel to the right will be accepted as an instruction for changing the target parking slot, allowing the target parking slot to be changed to S4. As described above, in forward parking, it is possible to change the target parking slot to the next parking slot, but it is not possible to change to the parking slot on the near side. Therefore, when the steering wheel is lightly turned to the right, the notification "the target is changed to the right slot" is made, whereas when the steering wheel is lightly turned to the left, the notification "parking is not possible in the left slot" is made, and the approach to parking slot S3 is continued.

Further, the means for instructing the start of automatic parking and the means for changing the target parking slot may include the operation of a blinker lever or a predetermined button operation. For example, the system may notify "The vehicle will be parked in the left parking slot" when the blinker lever is tilted to the left, and may notify "The target is changed to the right slot" when the blinker lever is tilted to the right during automatic parking. In the case of the blinker lever, since the blinker lever cannot be further tilted to the left from a state where it is already tilted to the left, it is intuitively understood that the target parking slot cannot be changed to the left slot (that is, the slot on the near side).

In forward parking, speed control may be added in addition to steering angle control, such as automatic steering. For example, automatic parking using forward parking tends to result in a higher vehicle speed compared to backward parking, where the vehicle stops once and then reverses into the parking slot. Accordingly, parking support apparatus 100 may decelerate vehicle 1 upon receiving a change instruction. This allows securing time for the passenger to confirm an announcement or similar information, reducing the acceleration felt by the passenger due to a steering angle change, and increasing the temporal margin for setting a branching route. Since this control has a certain effect even in the case of backward parking, parking support apparatus 100 may be configured to cause vehicle 1 to decelerate upon receiving a change instruction.

Further, also for the forward parking, a branching point may be set in the middle of the parking route in the same manner as in the case of backward parking. Specifically, parking support apparatus 100 may use the set branching point as the starting point for a branching route to park in the next parking slot before the automatic parking begins. For example, the branching route may be divided into a first curved section, a first straight section, a last curved section, and a last straight section, and then the turning radius of the curved sections and the inclination of the straight sections may be determined in advance, or the branching route may be determined when the change instruction is received.

Figure 12:
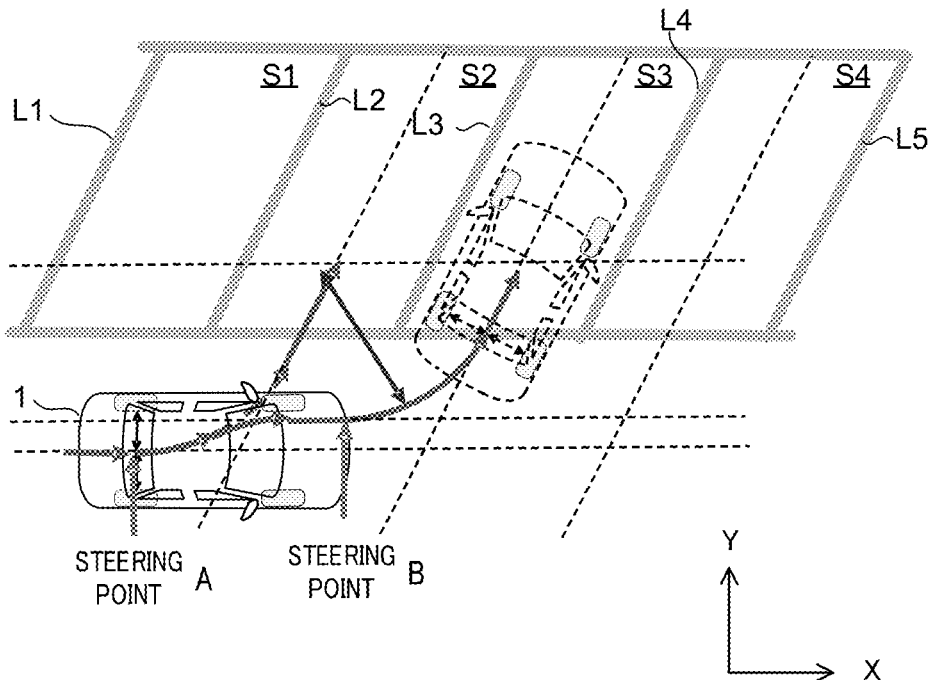
FIG. 12 is a diagram for describing a parking example by forward parking using the parking support apparatus.

For example, as illustrated in FIG. 12, the inclination of the last straight section (the straight section toward the parking position) in the branching route toward parking slot S3, with respect to the direction of the passage (the course of the vehicle to steering point A), is the same as the inclination of the center line of parking slot S3. Since parking slot S3 is parallel to parking slot S2, the inclination of the last straight section of the branching route can be the same as the inclination of the last straight section of the parking route to parking slot S2. That is, some of the set values for the branching route do not need to be newly calculated and the values set for an existing parking route can be used. Additionally, when the first straight section of the branching route is predetermined to be parallel to the direction of the passage (the course of the vehicle to steering point A), there is no need to calculate the inclination of the first straight section. Then, the central angle of the arc along which vehicle 1 turns between the first straight section and the last straight section of the branching route is the same as the central angle of the arc in the parking route to parking slot S2. Therefore, the same turning radius is used, and all the set values of the calculated curved sections can be used. To make the first straight section of the branching route parallel to the passage, the arc from the steering point A to the branching point can be used as the first curved section of the branching route by rotating the arc 180 degrees around the branching point. That is, the inclination of the straight section, the turning radius, and the arc length of the curved section of the branching route leading to parking slot S3 are determined at the time of the change instruction, making further calculations unnecessary. As described above, many of the set values for the parking route to parking slot S2 can be used as the set values for the branching route.

Only the lengths of the two straight sections are what cannot use the initial set values of the parking route and are needed to be newly set for the branching route. However, since the amount of processing required is small, the branching route can be set after receiving the change instruction, or the branch can be set in advance by pre-setting several branching points before the change instruction is received. Since the length of this straight section depends on the length of the arc from the steering point A to the branching point, it is preferable to separately assume a plurality of lengths of the arc and set them in advance.

Further, in a case where the timing of the change instruction is early and the position that has accepted the change instruction is close to the passage, it may be acceptable to return the vehicle to the passage. For example, when a change is instructed immediately after the vehicle starts turning at steering point A in FIG. 11, the vehicle will return to the passage, travel straight along the passage, and then start turning at steering point B to park in parking slot S3. When the vehicle is returned to the passage, it is possible to continue driving the vehicle on the passage, allowing for continuous change instructions from the passenger. When the passenger continuously instructs a change of the target parking slot, and the vehicle continues traveling at a position close to the parking slot, as in the first straight section of the branching route in FIG. 12, it becomes dangerous when the vehicle approaches a parking slot with another vehicle parked therein. Accordingly, for example, when the vehicle is at the first straight section of the branching route in FIG. 12, and the passenger further instructs a change of the target parking slot, expressing the intention not to park in parking slot S3, the vehicle may be returned to the passage. When the vehicle is returned to the passage, the aforementioned risk is eliminated. Therefore, when it is possible to return the vehicle to the passage, it should be done as much as possible.

Further, when the timing of the change instruction is delayed and the vehicle receives the change instruction when it is already close to the parking slot, it may be necessary to turn the vehicle more than once to park correctly in the next parking slot. In such a case, the vehicle may be automatically parked along a route that includes such turning. However, as described above, turning the vehicle more than once contradicts the request for forward parking (speedy parking), and then it is possible to continue parking in the initial parking slot by notifying "The parking slot cannot be changed". That is, the apparatus may be configured not to accept the change instruction based on the position of the vehicle when the change instruction is given.

Further, the timing at which the change instruction is received may be before the start of the turning. For example, notifier 180 of parking support apparatus 100 may announce "The vehicle will be parked in the nearer parking slot" before starting the turn to enter the parking slot. When the passenger does not agree, the system may allow changing the target parking slot to the next slot. When the change instruction is accepted before the start of the turning, the operation of changing to the next parking slot without starting the turning is referred to as a skip. It may be said that automatic parking starts from the moment the automatic parking is instructed, but in appearance, the vehicle traveling in the passage does not look like it is executing automatic parking. Therefore, it can be considered that automatic parking starts when the vehicle begins turning and approaches the parking slot, and the traveling after the turning has started for entering the parking slot may be called automatic parking. In this manner, this skip may be referred to as changing the target parking slot before the start of automatic parking. Here, when the instruction means for skipping (changing the target parking slot before the start of automatic parking) is set to be the same as the means for changing the target parking slot after the start of automatic parking, the passenger can change the target parking slot without considering whether it is before or after the start of automatic parking. Further, since the change instruction is accepted even after the start of the turning, the passenger can instruct the change whenever the passenger notices it, without needing to alter the method of indication based on timing.

For example, when the passenger tilts the blinker lever to the left before the steering point A to instruct automatic parking, it is assumed that an announcement "The vehicle will be parked in this parking slot" is made when vehicle 1 approaches the steering point of parking slot S2. When the passenger does not want to park vehicle 1 in parking slot S2 and returns the blinker lever to the neutral position, an announcement "This parking is skipped" is made, and vehicle 1 continues to travel straight without making a turn. Alternatively, after vehicle 1 starts turning to the left, when the passenger does not want to park and returns the blinker lever to the neutral position, an announcement saying "This parking is skipped" is made, and vehicle 1 returns to the original passage.

In this manner, the same result is obtained for the same operation, allowing the vehicle to be parked in the intended parking slot regardless of timing, thus enabling the passenger to use the automatic parking system without any trouble.

Further, the operation to change the parking slot may be performed by a predetermined button operation, and the passenger who instructs the change in the parking slot may be a passenger other than the driver, such as a passenger in the passenger seat. For example, after the automatic parking is started with parking slot S2 as the target parking slot in response to the hazard lamp button being pressed by the passenger in the passenger seat before steering point A, the passenger in the passenger seat may notice that there is a problem with parking slot S2. Further, the passenger of the passenger seat may notice that the vehicle is heading towards an unintended parking slot when the passenger, intending to park vehicle 1 in parking slot S3, presses the hazard lamp button too early, causing vehicle 1 to start turning towards parking slot S2. In such a case, parking support apparatus 100 may accept the pressing of the hazard lamp button again as an instruction to change the parking slot.

Parking support apparatus 100 may inquire about the intention to change the target parking slot by using the HMI apparatus 20 when a predetermined button, such as the hazard lamp button, is operated. This is because the passenger may operate the button even when there is no intention to change the target parking slot. In a case where there is an inquiry, parking support apparatus 100 may accept the intention to change the target parking slot through the touch panel of HMI apparatus 20 (so that the passenger in the passenger seat can perform the operation) or by an driver's operation, such as the operation of the steering wheel or the blinker lever. Further, the predetermined button is not limited to a physical button such as a hazard lamp button; it may also be a software button displayed on a touch panel.

Further, when parking support apparatus 100 inquires the intention to change the target parking slot, parking support apparatus 100 may cause vehicle 1 to decelerate or stop. For example, when vehicle 1 comes to a temporary stop, the progression of the automatic parking stops. This allows the passenger to spend sufficient time confirming the message for inquiring the intention and performing the operation to change the target parking slot. Additionally, when vehicle 1 is stopped, the passenger may not need to visually check the surroundings of vehicle 1. Further, since the passenger may turn on the hazard lamp when there is any problem, parking support apparatus 100 may decelerate vehicle 1 in parallel with the inquiry of the intention, on the condition that the hazard lamp is operated.

Hereinafter, the issue concerning the case where the operation to change the parking slot involves steering wheel will be described. For example, when the steering wheel operation is the means to instruct the start of automatic parking, allowing the target parking slot to be changed using the same steering wheel operation makes the means for changing the target parking slot more acceptable. Further, since the steering wheel is used as a means for changing the course, it is easy to recognize the steering wheel as a means for changing the target parking slot. Therefore, even when the instruction means for automatic parking is not a steering wheel operation, the driver is likely to accept the steering wheel operation as a means for changing the target parking slot.

However, when the steering wheel is used as a means for changing the target parking slot, associated problems arise.

For example, when the steering wheel is operated to give the instruction for changing the target parking slot, the course of vehicle 1 may change, causing the vehicle to deviate from the set parking route. In automatic parking, the vehicle travels along the route set for vehicle 1 while the steering angle is feedback-controlled; therefore, when the deviation from the route is small, vehicle 1 returns to the set route through feedback control. However, when the deviation is large, the return is delayed or vehicle 1 may not return to the route.

Accordingly, parking support apparatus 100 may be controlled to reduce the deviation width from the route generated when the steering wheel is operated as the means for changing the target parking slot. For example, when a steering wheel operation is detected during automatic parking, parking support apparatus 100 may immediately notify that an instruction for changing the target parking slot has been accepted, prompt the passenger to release the steering wheel, and cause the steering angle to return to the state before the steering wheel operation as early as possible. For example, parking support apparatus 100 may notify the passenger to release the steering wheel by displaying a message such as "Please release the steering wheel" or by causing the steering wheel to vibrate, thereby urging the passenger to release the steering wheel.

Further, when a steering wheel operation is detected during automatic parking, parking support apparatus 100 may generate a reaction force (torque in a direction opposite to the operation direction) against the steering wheel operation in the electric power steering (EPS: Electric Power Steering Systems) according to an instruction from travel controller 160, and may suppress a change in the steering angle due to the steering wheel operation. However, when the EPS generates a reaction force, there is a possibility that this reaction force may interfere with danger avoidance when the passenger is steering to avoid danger.

Accordingly, for example, when the change rate of the steering torque or the steering angle exceeds a predetermined threshold, or when the notification or the vibration of the steering wheel is present but the steering continues, parking support apparatus 100 may determine that the steering is being performed for the purpose of danger avoidance. In a case where it is determined that the steering is performed for the purpose of danger avoidance, parking support apparatus 100 may generate a forward torque in the direction of the passenger's steering and may support the steering. Conversely, when the change rate of the steering torque or the steering angle is small, parking support apparatus 100 may generate a reaction force until the vibration of the steering wheel ceases, assuming that the steering is not for the purpose of danger avoidance.

Specifically, parking support apparatus 100 controls the EPS in the following manner.

In a case where the steering torque is less than a first threshold, it is determined to be noise and is ignored (it is not determined to be an avoidance operation or a change instruction).

In a case where the steering torque is equal to or larger than a second threshold, which is greater than the first threshold, forward torque is generated, and steering support is provided (it is determined that the steering is an avoidance operation).

In a case where the steering torque is equal to or larger than the first threshold and smaller than the second threshold, reverse torque is generated, causing the steering wheel to vibrate.

In a case where the steering torque is equal to or larger than the first threshold even after a predetermined time has elapsed since the start of vibration, the control apparatus determines that an avoidance operation is being performed, stops the vibration, generates forward torque, and assists the steering.

In a case where the steering torque becomes less than the first threshold within the predetermined time from the start of the vibration, the control apparatus determines that it is a change instruction, stops the vibration, and starts the automatic steering for merging into the route or the branching route.

In the case where parking support apparatus 100 is controlled as described above, and when the passenger steers to avoid danger, the passenger only needs to either turn the steering wheel strongly or continue turning the steering wheel while ignoring the vibration. By doing so, the passenger can receive steering support. Further, in a case where a parking slot change is instructed, it is possible to minimize the amount of course deviation due to steering intervention by lightly turning the steering wheel for a short duration. Since the steering wheel operation is ignored when it is too weak, the steering wheel should be turned until it vibrates, and then released when it starts to vibrate.

Further, when the passenger discovers a problem during automatic parking, the brake may be operated. For example, when the passenger discovers that a pedestrian is in the parking slot, the brake is operated. At this time, when the adjacent parking slot is vacant, the passenger may wait until the pedestrian leaves the parking slot or may continue the automatic parking by changing the parking slot.

Accordingly, parking support apparatus 100 may inquire whether there is an intention to change the target parking slot when an operation of the brake is detected during automatic parking in a location where there are consecutive vacant parking slots. The intention to change the parking slot may be accepted by any one of the aforementioned instruction means. That is, the intention to change may be accepted by an operation of the steering wheel or the blinker lever, or it may be accepted by an operation of the touch panel. As long as vehicle 1 has stopped due to the operation of the brake, there is no issue with the driver looking at or operating the touch panel.

When the driver releases the brake without performing any operation in response to the inquiry, parking support apparatus 100 may be configured to continue the automatic parking without changing the parking slot, or may be configured to maintain the stopped state of vehicle 1 until an operation indicating an intention is performed.

Further, when both the steering wheel and the brake are operated during automatic parking, the probability that the operation is for danger avoidance is higher than when only the steering wheel is operated. Accordingly, when both the steering wheel and the brake are operated, parking support apparatus 100 may lower a second threshold for determining the torque than when only the steering wheel is operated, and may be configured to generate torque that assists the steering operation, instead of torque that counteracts the steering operation by the EPS. Further, parking support apparatus 100 may, under the condition that both the steering wheel and the brake are operated, either prohibit EPS from generating torque that counteracts the steering operation or cause EPS to generate forward torque that assists the steering operation.

Figure 13:
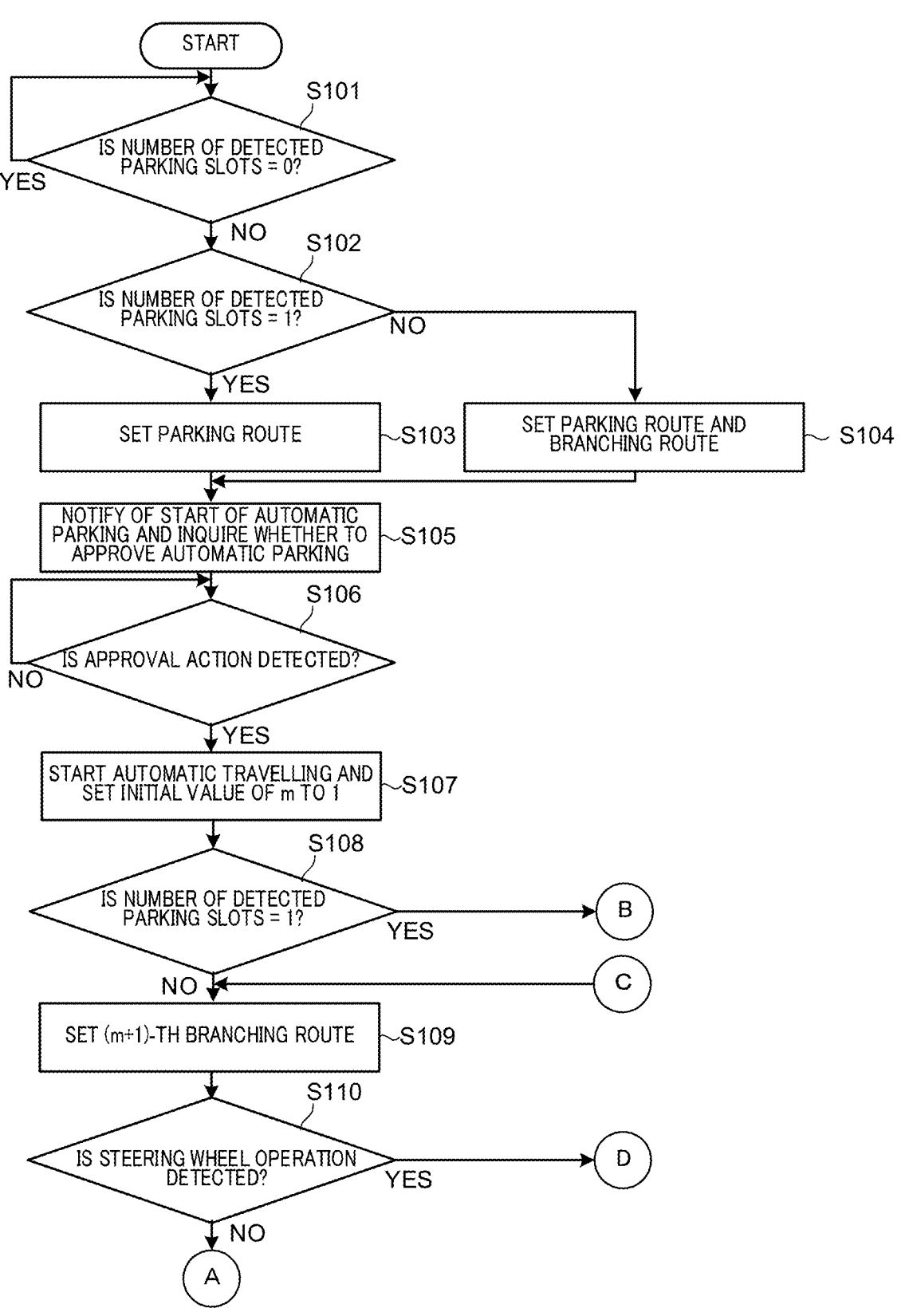
FIG. 13 is a flowchart illustrating an exemplary behavior of parking support control using the parking support apparatus.
Figure 14:
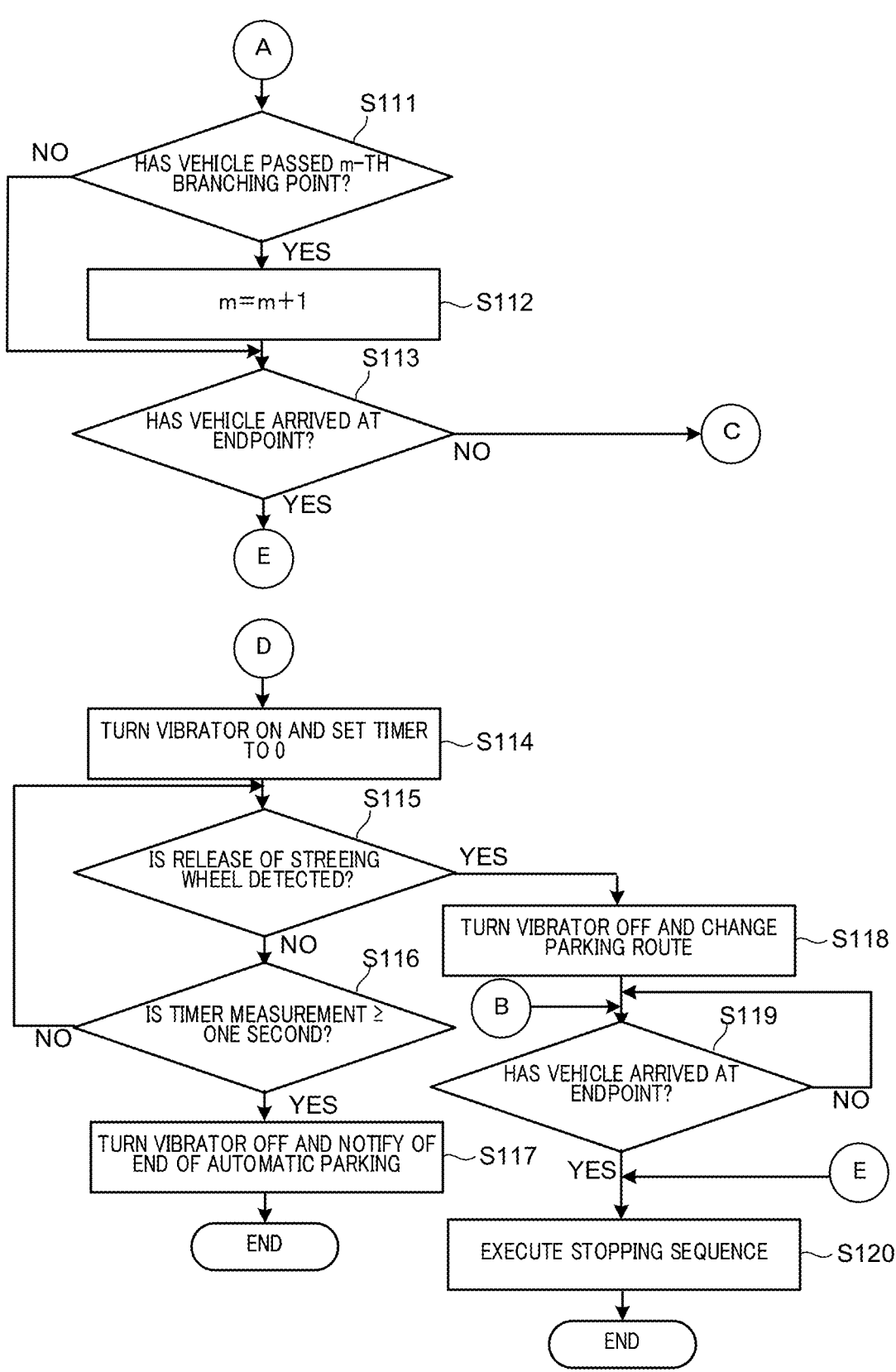
FIG. 14 is a flowchart illustrating the exemplary behavior of the parking support control using parking support apparatus.

Next, an exemplary behavior of parking support apparatus 100 will be described. FIGS. 13 and 14 are flowcharts illustrating an exemplary behavior of the parking support control of parking support apparatus 100. Parking support apparatus 100 is activated when the parking slot detection button is pressed by the passenger. This control, as described in the flowchart, starts when parking support apparatus 100 and its parking slot detector 140 are activated, and the parking slot detection is turned ON.

In the initial state at the start, vehicle 1 may be stopped or may be traveling. Parking support apparatus 100 according to the present embodiment may support both automatic parking by forward parking and automatic parking by backward parking, or may support only one of them. Here, it is assumed that whether the automatic parking is forward parking or backward parking is determined at the start. For example, when the parking slot detection button is pressed when the gear of vehicle 1 is in the forward position, forward parking may be determined at that point. Further, when the parking slot detection button is pressed when vehicle 1 has turned and stopped from a straight traveling state, and the gear is in the backward position, backward may be determined at that point. In parking support apparatus 100, the operation of a button or a gear is accepted by operation receiver 110, and the determination and management of the determination results are performed by state manager 120. That is, whether to automatically park in a forward direction or a backward direction is determined by state manager 120 by the start point.

As illustrated in FIG. 13, state manager 120 of parking support apparatus 100 determines whether the number of detected parking slots is 0 based on the detection results from parking slot detector 140 (step S101). When it is determined that the number of detected parking slots is 0 (step S101, YES), the processing is returned to step S101. That is, the processing in step S101 is repeated until parking slot detector 140 detects a parking slot.

On the other hand, when the detection number of the parking slot is not 0 (step S101, NO), state manager 120 determines whether the detection number of the parking slot is 1 (step S102). When the determination result is that the detection number of the parking slot is 1 (step S102, YES), parking slot detector 140 sets a parking route (step S103). In step S103, a parking route corresponding to the detected parking slot is set, and the parking route set by parking slot detector 140 is stored in storage 170.

On the other hand, when the number of detected parking slots is 2 or more (step S102, NO), route setter 150 of parking support apparatus 100 sets a parking route and a branching route that branches off from the parking route (step S104). In step S104, the parking route is set for parking in the first candidate parking slot among the plurality of detected parking slots, and the branching route is set for parking in the second candidate parking slot from a branching point in a middle of the parking route. The first candidate parking slot and the second candidate parking slot are selected from a plurality of parking slots based on conditions for parking vehicle 1. For example, in the case of forward parking, the parking slot with the steering point closest (in the forward direction) to vehicle 1 among the parking slots of vehicle 1 may be selected as the first candidate parking slot, and the parking slot with the second closest steering point (in the forward direction) to vehicle 1 may be selected as the second candidate parking slot. Further, in the case of backward parking, the parking slot among the plurality of parking slots that is closest to the rear end of the vehicle may be selected as the first candidate parking slot, and the parking slot that is the second closest to the rear end of the vehicle may be selected as the second candidate parking slot.

After step S103 or S104, notifier 180 notifies the passenger of the start of the automatic parking and inquires whether the automatic parking is approved (step S105). In step S105, for example, the announcement may be made in a manner such as, "Automatic parking is starting, so please release the steering wheel."

Next, state manager 120 determines whether an approval action (for example, an action corresponding to the inquiry, such as releasing the steering wheel) has been detected (step S106). When the result of the determination is that the approval action is not detected (step S106, NO), state manager 120 repeats the processing in step S106. When the approval action is detected (step S106, YES), travel controller 160 of parking support apparatus 100 starts automatic travelling, and state manager 120 sets the initial value of the variable m to 1 (step S107). Here, m is the number of the branching route, where a pre-set branching route is the m-th branching route, and the next branching route to be set is the (m+1)-th branching route. In the processing of step S107, m is set to 1 corresponding to the case where the second candidate parking route (first branching route) is already set in the processing of step S104. When the detection number of the parking slot is 1, there is no preset branching route, so m does not match the number of preset branching routes. However, this is not an issue because m is not referred to when the detection number of the parking slot is 1.

Next, state manager 120 determines whether the number of detected parking slots is 1 (step S108). This step differentiates the processing of a case where there is no change of the target parking slot from the processing of a case where there is a change of the target parking slot. When the determination result is that the detection number is 1 (step S108, YES), the processing branches to B and then proceeds to step S119. The processing in step S119 is for normal automatic parking where there is no change of the target parking slot, and it does not refer to the number m of the branching route. On the other hand, when the detection number is 2 or more (step S108, NO), the processing for the case where there is a change of the target parking slot will begin from step S109 onwards. First, in step S109, route setter 150 sets the (m+1)-th branching route (step S109). The (m+1)-th branching route is the next branching route that branches off at a branching point after the branching point of the nearest branching route (m-th branching route), and the vehicle is setting the next branching route while performing automatic parking.

At the time of the automatic parking start, m is 1, and branching route 1 (the first parking route among parking routes for parking in a parking slot of the second candidate) which branches off at the first branching point (branching point 1) has been already set.

Therefore, the branching route set in step S109 is branching route 2, which branches off at the next branching point 2. That is, by setting the branching route m+1, (which branches off at the next (m+1)-th branching point) by the time the vehicle reaches the m-th branching point, a state (in which the branching route that branches off at a branching point located in the traveling direction is always set) can be achieved.

Next, state manager 120 determines whether or not a steering wheel operation is being performed (step S110). The steering wheel operation is an example of an operation for instructing a change of the target parking slot. When the determination result is that no steering wheel operation is detected (step S110, NO), as shown in FIG. 14, state manager 120 determines whether vehicle 1 has passed the m-th branching point (step S111).

When the result of the determination is that vehicle 1 has passed the m-th branching point (step S111, YES), state manager 120 updates m to m+1 (step S112). After step S112, or in step S111, when vehicle 1 has not passed the m-th branching point (step S111, NO), parking support apparatus 100 evaluates the distance that vehicle 1 has traveled, and determines whether vehicle 1 has arrived at the endpoint of the parking route (target parking position) (step S113).

When it is determined that vehicle 1 has not arrived at the endpoint (step S113, NO), the processing is returned to step S109. That is, the processing returns to the setting of the branching route, and the next branching route is set each time vehicle 1 crosses the branching point again. On the other hand, when vehicle 1 has arrived at the endpoint (step S113, YES), the processing proceeds to step S120 and executes the stopping sequence to end the automatic parking. That is, when a plurality of parking slots is detected, the control apparatus executes the automatic parking while setting the branching route. When the control apparatus does not detect the steering wheel operation for instructing the target parking slot change in the meantime, the control apparatus causes the vehicle to be parked in the initial parking slot as it is and ends the automatic parking.

When a determination in step S110 detects a steering wheel operation (step S110, YES), the processing proceeds to D. From D onwards, the processing corresponds to handling the instruction for changing the target parking slot. As illustrated in FIG. 14, the processing proceeds from D to step S114. In step S114, notifier 180 turns the vibrator on, and state manager 120 sets the timer to 0. In this step S114, the processing of accepting a change in the target parking position is initiated. Specifically, the vibrator causes the steering wheel to vibrate, and the timer measures the duration of the vibration. That is, the control apparatus notifies the driver of the change in the target parking position by vibrating the steering wheel and detecting the instruction for changing the target parking slot. Further, while the steering wheel is being vibrated, control for maintaining the course by generating torque that counteracts the steering with the EPS may be added simultaneously.

The evaluation of the steering torque may be added to step S110. For example, state manager 120 of parking support apparatus 100 may, when detecting the steering wheel operation, evaluate the steering torque. It may determine as YES only when the steering torque is equal to or larger than the first threshold and smaller than the second threshold, meaning it is not for danger avoidance. When the result of the steering torque evaluation indicates that the steering torque is equal to or greater than the second threshold, it is determined that the steering is for danger avoidance. In such a case, the processing branches to step S117 in an unillustrated transition and may terminate the automatic parking.

When it is determined that the instruction is for changing the target parking slot (step S110, YES), state manager 120 determines whether the release of the steering wheel has been detected after vibrating the wheel in step S114 (step S115). When the determination result is that the release of the steering wheel is not detected (step S115, NO), state manager 120 determines whether the measurement by the timer is equal to or longer than one second (step S116).

When it is determined that the measurement by the timer is equal to or longer than one second (step S116, NO), the processing is returned to step S115. That is, when the vibration time of the steering wheel is less than one second, the detection of the steering wheel release continues. When the measurement by the timer is equal to or longer than one second (step S116, YES), parking support apparatus 100 turns off the vibrator, notifies the end of the automatic parking (step S117), and ends the current control after step S117. The reason for ending the automatic parking is to address situations where the passenger continues to operate the steering wheel to avoid danger and where steering control cannot be performed when the passenger continues to grip the steering wheel. That is, when the steering wheel is steered for one second or longer, the control apparatus determines that the passenger requires manual control of the steering wheel or that it is difficult to continue the automatic steering, and ends the automatic parking. Further, after step S117, a control to generate forward torque using EPS and assist steering may be added.

Returning to the determination in step S115, and when the release of the steering wheel is detected (step S115, YES), notifier 180 of parking support apparatus 100 turns off the vibrator, and travel controller 160 changes the parking route (step S118). In step S118, the parking route is changed to a route that passes through the m-th branching route. That is, when the steering wheel is steered for only a short time, the control apparatus determines that the instruction is to change the target parking slot, and changes the course to branching route m from the nearest branching point in the forward direction.

Next, state manager 120 determines whether vehicle 1 has arrived at the endpoint of the parking route (target parking position) (step S119). Since the information on the parking route includes the distance to the endpoint of the parking route, in step S119, it is determined whether vehicle 1 has traveled the distance to the endpoint.

When it is determined that vehicle 1 has not arrived at the endpoint (step S119, NO), the processing of step S119 is repeated. When vehicle 1 arrives at the endpoint (step S119, YES), parking support apparatus 100 executes a stopping sequence (step S120). The stopping sequence includes notifying that the automatic parking has been completed and engaging the parking brake. After step S120, the present control ends.

According to the present embodiment configured as described above, parking support apparatus 100 sets a parking route for parking the vehicle in the first parking slot when a plurality of parking slots are detected. It also sets a branching point on the parking route and establishes a branching route for parking the vehicle in the second parking slot from the branching point. When parking support apparatus 100 detects a change instruction operation for changing the target parking slot while the vehicle is being automatically parked along the first parking route, parking support apparatus 100 causes the vehicle to be automatically parked along the branching route.

Thus, the change instruction operation allows the parking position for automatic parking to be changed from the first parking slot to the second parking slot. When changing the parking position, automatic parking can be performed without stopping during the parking since the branching route to park in the second parking slot is already set. That is, it is possible to shorten the time taken for parking when the parking position is changed to another parking slot.

Further, since the setting related to the branching route is performed before the automatic parking starts, there is no need to temporarily stop the vehicle for the setting of the branching route when there is a change instruction operation for changing the parking position to the second parking slot. For this reason, even when the parking position is changed to another parking slot, it is possible to smoothly perform automatic parking of vehicle 1.

Further, at least one of the turning radius of the turning section in the branching route, the arc length of the turning section, and the angle of the straight section of the branching route is set based on the set value of the first parking route, and therefore the setting of the second parking route can be simplified.

Further, when the change instruction operation is detected, parking support apparatus 100 selects the nearest branching point from the plurality of branching points, travels along the first parking route until the nearest branching point, and automatically parks along the branching route from the nearest branching point. In this manner, the time from when the passenger gives the change instruction to when the course change is made is short, thus improving the perceived responsiveness and usability.

Further, parking support apparatus 100 sets the intervals between the branching points based on the time required to set the branching route, and sets a next branching route each time a branching point is passed. As described above, by dispersing the timing for setting a branching route, it is possible to set a branching route even when the processing performance is low. For this reason, it is possible to reduce the cost of parking support apparatus 100.

Further, parking support apparatus 100 accepts operations such as steering wheel or blinker lever operations, which can be performed while monitoring the surroundings, as change instruction operations. This allows for changing the target parking slot without the need to visually recognize or operate a display screen. Thus, it is possible to change the parking position to another parking slot without hindering the safety confirmation around the vehicle. Further, parking support apparatus 100 also accepts the change instruction operation when the operation of a predetermined button is detected, allowing a passenger in the passenger seat to issue the change instruction.

Further, when any one of the steering force, the steering time, and the angular velocity in the steering operation exceeds the first threshold and does not exceed the second threshold, the control apparatus determines that a change instruction operation has been detected. Thus, when the steering operation is not a change instruction operation but a steering operation for avoiding danger, it is possible to prevent erroneous determination that it is a change instruction operation.

Further, when the steering operation does not exceed the second threshold, torque that counteracts the steering operation is generated by the vehicle's electric power steering. Thus, it is possible to suppress the vehicle from deviating from the automatic parking route due to the influence of the change instruction operation. Further, when the operation of the steering exceeds the second threshold, the electric power steering does not generate the torque counteracting the steering operation. Thus, it is possible to ensure that danger avoidance is not hindered when the steering operation is for danger avoidance rather than for change instruction operation.

Further, when both the operation of the steering and the operation of the brake are detected during automatic parking, the electric power steering is prevented from generating torque that counteracts steering operation, or it is made more difficult for the electric power steering to generate such torque counteracting steering operation as compared to when only the steering operation is detected and the brake operation is not detected. This is based on the consideration that, when both the steering wheel and the brake are operated during automatic parking, the likelihood of the operation being for danger avoidance is higher than when only the steering wheel is operated. Thus, it is possible to control the system so as not to prevent steering for danger avoidance.

Further, when the steering operation is detected, the steering is vibrated, and when the force or torque applied to the steering becomes less than a third threshold, the control apparatus determines that a change instruction operation has been detected. By notifying the passenger that a change instruction operation has been detected and having them release the steering wheel, deviation of the vehicle from the parking path can be prevented.

Further, in the setting of the parking route when a plurality of parking slots is detected, the control apparatus adjusts the steering to initiate turning earlier, increase the turning radius of the turning section, or extend the length of the straight section, as compared to the parking route set when only one parking slot is detected. Thus, the passenger can detect the target parking position at an early stage, making it easier to set the branching route.

Further, when notifying the passenger of the vehicle's behavior, the notification includes the target parking position or issue the notification earlier than the timing for turning, allowing the passenger to quickly recognize the target parking position.

Further, when any one of the steering operation, the brake pedal operation, and the operation of a predetermined button is detected while the vehicle is performing automatic parking along the first parking route, a notification is issued to inquire about an intention to change the target parking slot. Thus, it is possible to confirm with the passenger whether or not the operation is an instruction for changing the target parking slot, and therefore the vehicle can be automatically parked reliably in the parking slot desired by the passenger.

Further, when the change instruction operation is detected, the vehicle's speed is controlled to slow the vehicle down. Thus, it is possible to secure time for the passenger to confirm an announcement or the like, to reduce the acceleration that the passenger feels due to the change in the steering angle, and to increase the temporal margin for setting a branching route.

Further, when a notification inquiring about an intention to change the target parking slot is issued, the vehicle speed is controlled to slow the vehicle down during the notification, thereby securing time for the passenger to confirm the intention of changing the target parking slot.

Further, the second parking slot is selected from parking slots adjacent to the first parking slot, and therefore it is possible to facilitate the setting of a parking route to the second parking slot, which branches off from the parking route to the first parking slot. In addition, the method of selecting the second parking slot can be simplified.

The embodiments above are no more than specific examples in carrying out the present invention, and the technical scope of the present invention is not to be construed in a limitative sense due to the specific examples. That is, the present invention can be carried out in various forms without departing from the spirit and the main features thereof.

While various embodiments have been described herein above, it is to be appreciated that various changes in form and detail may be made without departing from the spirit and scope of the invention(s) presently or hereafter claimed.

This application is entitled and claims the benefit of Japanese Patent Application No. 2023-148443, filed on Sep. 13, 2023, the disclosure of which including the specification, drawings and abstract is incorporated herein by reference in its entirety.

INDUSTRIAL APPLICABILITY

The parking support apparatus of the present disclosure is useful as a parking support method, a parking support apparatus, and a computer-readable recording medium each allowing for automatic parking into a changed target parking slot without requiring visual recognition of a screen for changing the target parking slot or any operation on the screen, and without any interruption in the process.

The invention claimed is:

1. A parking support method comprising:
receiving operation from a passenger of a vehicle;
detecting a parking slot;
setting a parking route for the vehicle;
setting a branching route that branches from the parking route; and
performing automatic parking of the vehicle along the parking route;
wherein,
when a plurality of the parking slots are detected in the detecting the parking slot,
the setting the parking route includes setting a parking route for parking the vehicle in a first parking slot, and
the setting the branching route includes setting a branching point on the parking route and setting a branching route for parking the vehicle in a second parking slot from the branching point, and
the parking support method further comprises:
in the performing the automatic parking, receiving a change instruction operation for changing a target parking slot while the automatic parking of the vehicle is performed along a first parking route, and
in the receiving the change instruction operation, performing the automatic parking of the vehicle along the branching route when the change instruction operation is detected.

2. The parking support method according to claim 1, wherein:
the setting the branching route includes performing, before the automatic parking starts, a part or all of setting related to the branching route.

3. The parking support method according to claim 1, wherein:
the setting the branching route includes setting, based on a set value of the first parking route, at least one of a turning radius of a turning section of the branching route, a length of an arc in the turning section, and/or an angle of a straight section of the branching route.

4. The parking support method according to claim 1, wherein:
the setting the branching route includes setting a plurality of the branching points on the first parking route; and in the performing the automatic parking, when the change instruction operation is detected, a nearest branching point is selected from the plurality of branching points, the vehicle travels along the first parking route to the nearest branching point, and from the nearest branching point, the automatic parking is performed along the branching route.

5. The parking support method according to claim 4, wherein:

the setting the branching route includes setting an interval between the plurality of branching points based on a time required for the setting the branching route; and the setting the branching route includes setting the branching route while the automatic parking is being performed along the first parking route.

6. The parking support method according to claim 1, wherein:

in the performing the automatic parking, the change instruction operation is determined to be detected when an operation of a steering, an operation of a blinker lever, or an operation of a predetermined button is detected while the automatic parking of the vehicle is being performed along the first parking route.

7. The parking support method according to claim 6, wherein:

in the performing the automatic parking, the change instruction operation is determined to be detected when a value of the operation of the steering exceeds a first threshold and does not exceed a second threshold, the value being a steering force, a steering time, or an angular velocity.

8. The parking support method according to claim 7, wherein:

in the performing the automatic parking, torque that counteracts the operation of the steering is generated by an electric power steering of the vehicle when the value of the operation of the steering does not exceed the second threshold; and the torque counteracting the operation of the steering is not generated by the electric power steering when the value of the operation of the steering exceeds the second threshold.

9. The parking support method according to claim 7, wherein:

in the performing the automatic parking, when both the operation of the steering and an operation of a brake are detected, the torque counteracting the operation of the steering is not generated by the electric power steering of the vehicle, or the torque counteracting the operation of the steering is difficult to be generated by the electric power steering as compared to when the operation of the steering is detected and the operation of the brake is not detected.

10. The parking support method according to claim 8, wherein:

in the performing the automatic parking, when both the operation of the steering and an operation of a brake are detected, torque that counteracts the operation of the steering is not generated by an electric power steering of the vehicle, or the torque counteracting the operation of the steering is difficult to be generated by the electric power steering as compared to when the operation of the steering is detected and the operation of the brake is not detected.

11. The parking support method according to claim 6, wherein:

the vehicle has a function of vibrating the steering; and in the performing the automatic parking, the steering is vibrated when the operation of the steering is detected, and the change instruction operation is determined to be detected when a force or torque applied to the steering is less than a third threshold.

12. The parking support method according to claim 1, wherein:

in the setting the parking route, the parking route that is set when the plurality of parking slots are detected corresponds to one of following cases, as compared to the parking route that is set when only one parking slot is detected:

a turning starts early in a case of forward parking or backward parking, a turning radius of a turning section is large in a case of the forward parking, and a distance in which the vehicle travels in a straight line from a starting point of a route is long in a case of the backward parking.

13. The parking support method according to claim 1, further comprising:

notifying the passenger of behavior of the vehicle, wherein when the plurality of parking slots are detected, the notifying includes notifying of a target parking position or, at timing earlier than timing of the behavior of the vehicle, notifying of the behavior of the vehicle.

14. The parking support method according to claim 1, further comprising:

notifying the passenger of an inquiry about an intention to change the target parking slot, wherein in the performing the automatic parking, the notifying of the inquiry about the intention to change the target parking slot is performed when one of an operation of a steering, an operation of a brake pedal, and an operation of a predetermined button is detected while the automatic parking of the vehicle is being performed along the first parking route.

15. The parking support method according to claim 1, wherein in the performing the automatic parking, a speed of the vehicle is controlled to slow the vehicle down when the change instruction operation is detected.

16. The parking support method according to claim 14, wherein in the performing the automatic parking, a speed of the vehicle is controlled to slow the vehicle down when the notifying of the inquiry about the intention to change the target parking slot is performed.

17. The parking support method according to claim 1, wherein in the performing the automatic parking, the second parking slot is selected from parking slots adjacent to the first parking slot.

18. A parking support apparatus comprising:

a processor that performs receiving operation from a passenger of a vehicle, detecting a parking slot, setting a parking route for the vehicle, and performing automatic parking of the vehicle along the parking route, wherein the processor performs in the setting the parking route, setting a branching route that branches from the parking route, when a plurality of the parking slots are detected in the detecting the parking slot, setting a parking route for parking the vehicle in a first parking slot, and setting a branching point on the parking route and setting a branching route for parking the vehicle in a second parking slot from the branching point, in the automatic parking, receiving a change instruction operation for changing a target parking slot while the automatic parking of the vehicle is performed along a first parking route, and performing the automatic parking of the vehicle along the branching route when the change instruction operation is detected.

19. A computer-readable recording medium storing a parking support program, the parking support program causing a computer of a vehicle to execute:

reception processing of receiving operation from a passenger of the vehicle;

detection processing of detecting a parking slot;

route setting processing of setting a parking route for the vehicle;

branching setting processing of setting a branching route that branches from the parking route; and automatic parking processing of performing automatic parking of the vehicle along the parking route, wherein when a plurality of the parking slots are detected in the detection processing, the route setting processing includes processing of setting a parking route for parking the vehicle in a first parking slot, and the branching setting processing includes processing of setting a branching point on the parking route and setting a branching route for parking the vehicle in a second parking slot from the branching point, and in the automatic parking processing, the parking support program causes the computer to further execute:

processing of receiving a change instruction operation for changing a target parking slot while the automatic parking of the vehicle is performed along a first parking route, and processing of performing the automatic parking of the vehicle along the branching route when the change instruction operation is detected in the processing of receiving the change instruction operation.

* * * * *